(12) United States Patent
Khatwa

(10) Patent No.: US 11,941,995 B2
(45) Date of Patent: Mar. 26, 2024

(54) RUNWAY AWARENESS AND ALERTING SYSTEMS AND METHODS

(71) Applicant: HONEYWELL INTERNATIONAL INC., Charlotte, NC (US)

(72) Inventor: Ratan Khatwa, Redmond, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 247 days.

(21) Appl. No.: 17/464,375

(22) Filed: Sep. 1, 2021

(65) Prior Publication Data

US 2023/0060551 A1    Mar. 2, 2023

(51) Int. Cl.
*G08G 5/02* (2006.01)
*G06F 16/29* (2019.01)
*G08G 5/00* (2006.01)
*G08G 5/06* (2006.01)

(52) U.S. Cl.
CPC ............. *G08G 5/025* (2013.01); *G06F 16/29* (2019.01); *G08G 5/0013* (2013.01); *G08G 5/0021* (2013.01); *G08G 5/003* (2013.01); *G08G 5/065* (2013.01)

(58) Field of Classification Search
CPC ...... G08G 5/025; G08G 5/0021; G08G 5/003; G08G 5/065; G08G 5/0013
See application file for complete search history.

(56) References Cited

U.S. PATENT DOCUMENTS

| 8,271,191 | B2* | 9/2012 | Ishihara | G01S 19/52 |
| | | | | 342/36 |
| 9,092,976 | B2* | 7/2015 | Khatwa | G08G 5/0013 |
| 9,472,110 | B2* | 10/2016 | Murthy | G08G 5/06 |
| 9,487,304 | B1* | 11/2016 | Bowen | B64D 43/00 |
| 10,204,523 | B1* | 2/2019 | Ishihara | B64D 47/00 |
| 10,410,528 | B2 | 9/2019 | Scacchi et al. | |
| 10,650,690 | B2* | 5/2020 | Chartier | G08G 5/0078 |
| 10,739,161 | B2* | 8/2020 | Burlingame | B64D 45/08 |
| 11,176,838 | B2* | 11/2021 | Chartier | G08G 5/0008 |
| 11,511,883 | B2* | 11/2022 | Mast | B64D 45/00 |
| 11,549,821 | B2* | 1/2023 | Burlingame | B64D 45/00 |
| 11,670,183 | B2* | 6/2023 | Baladhandapani | G10L 15/22 |
| | | | | 701/120 |
| 2004/0030465 | A1* | 2/2004 | Conner | G08G 5/0013 |
| | | | | 701/16 |
| 2005/0015202 | A1* | 1/2005 | Poe | G08G 5/0078 |
| | | | | 340/945 |
| 2005/0128129 | A1* | 6/2005 | Conner | G08G 5/0013 |
| | | | | 342/36 |
| 2007/0126602 | A1 | 6/2007 | Bateman et al. | |

(Continued)

FOREIGN PATENT DOCUMENTS

EP    3133574 A1    2/2017

OTHER PUBLICATIONS

Honeywell (Mark V and Mark VII), Pilot's Guide—Enhanced Ground Proximity Warning System (EGPWS) and Flight Safety Functions TSO C151b Class A Taws, Aug. 8, 2011, Honeywell International Inc., Redmond, WA, USA.

Primary Examiner — Luis A Martinez Borrero
(74) Attorney, Agent, or Firm — Lorenz & Kopf LLP

(57) ABSTRACT

Runway awareness and advisory systems (RAAS) and methods are provided for an aircraft. A variety of alerts can be provided based on integrating FMS data with the RAAS systems.

20 Claims, 15 Drawing Sheets

(56) References Cited

U.S. PATENT DOCUMENTS

| | | | |
|---|---|---|---|
| 2008/0027596 A1* | 1/2008 | Conner | G08G 5/0021 701/16 |
| 2008/0249675 A1 | 10/2008 | Goodman et al. | |
| 2008/0275642 A1* | 11/2008 | Clark | G01C 23/00 701/457 |
| 2009/0115637 A1 | 5/2009 | Naimer et al. | |
| 2011/0074607 A1* | 3/2011 | Khatwa | G08G 5/0008 340/947 |
| 2011/0130963 A1* | 6/2011 | Feyereisen | G08G 5/0065 345/595 |
| 2011/0184635 A1* | 7/2011 | Khatwa | G08G 5/025 701/120 |
| 2012/0130624 A1* | 5/2012 | Clark | G08G 5/0021 701/120 |
| 2013/0271300 A1* | 10/2013 | Pepitone | G08G 5/0065 340/972 |
| 2014/0077975 A1* | 3/2014 | Khatwa | G08G 5/0021 340/972 |
| 2015/0019047 A1* | 1/2015 | Chandrashekarappa | G08G 5/0021 701/3 |
| 2015/0084793 A1* | 3/2015 | Khatwa | G08G 5/065 340/969 |
| 2015/0127196 A1* | 5/2015 | Ishihara | G01C 23/00 701/16 |
| 2015/0154874 A1* | 6/2015 | Murthy | G08G 5/065 701/120 |
| 2015/0243174 A1* | 8/2015 | Conner | G08G 5/025 701/120 |
| 2015/0262493 A1 | 9/2015 | Jensen et al. | |
| 2016/0347473 A1* | 12/2016 | Khatwa | G05D 1/0083 |
| 2017/0162066 A1 | 6/2017 | Scacchi et al. | |
| 2018/0061243 A1* | 3/2018 | Shloosh | G08G 5/0043 |
| 2019/0318639 A1* | 10/2019 | Chartier | G08G 5/065 |
| 2019/0323856 A1* | 10/2019 | Burlingame | G08G 5/0013 |
| 2020/0051442 A1* | 2/2020 | S. | G01C 23/00 |
| 2020/0090531 A1* | 3/2020 | Baladhandapani | G08G 5/0013 |
| 2020/0150689 A1* | 5/2020 | Khatwa | B64D 45/04 |
| 2020/0326206 A1* | 10/2020 | Burlingame | G01C 23/005 |
| 2021/0221531 A1* | 7/2021 | Kanagarajan | G08G 5/025 |
| 2021/0276728 A1* | 9/2021 | Mast | B64D 45/08 |
| 2022/0343780 A1* | 10/2022 | Miller | G08G 5/0039 |
| 2023/0115810 A1* | 4/2023 | Burlingame | G01C 23/005 701/17 |

* cited by examiner

ON-GROUND APPROACHING
RUNWAY ADVISORY METHOD
100

110 — RECEIVE FMS DATA IDENTIFYING RUNWAY

120 — DETERMINE AIRCRAFT POSITION

130 — DETERMINE WHETHER AIRCRAFT IS TAKING OFF

140 — OUTPUT APPROACHING RUNWAY ADVISORY OF THE INTERSECTING RUNWAY WHEN THE AIRCRAFT IS NOT TAKING OFF

150 — INHIBIT APPROACHING RUNWAY ADVISORY WHEN THE AIRCRAFT IS TAKING OFF

FIG. 2

RUNWAY OCCUPANCY
ADVISORY METHOD
300

310 RECEIVE FMS DATA IDENTIFYING TAKE OFF RUNWAY

320 DETERMINE AIRCRAFT POSITION

330 DETERMINE WHETHER AIRCRAFT IS TAKING OFF

340 OUTPUT RUNWAY OCCUPANCY ADVISORY WHEN THE AIRCRAFT IS TAKING OFF AND AIRCRAFT IS NOT ON THE TAKE OFF RUNWAY

350 INHIBIT RUNWAY OCCUPANCY ADVISORY WHEN THE AIRCRAFT IS TAKING OFF AND IS ON THE TAKEOFF RUNWAY

FIG. 3

ON-GROUND SHORT
RUNWAY ALERT METHOD
400

410 — RECEIVE FMS DATA IDENTIFYING TAKE OFF RUNWAY

420 — DETERMINE AIRCRAFT POSITION

430 — DETERMINE WHETHER AIRCRAFT IS TAKING OFF

440 — OUTPUT SHORT RUNWAY ALERT WHEN THE AIRCRAFT IS TAKING OFF

450 — INHIBIT SHORT RUNWAY ALERT WHEN THE AIRCRAFT IS NOT TAKING OFF

FIG. 4A

TAKE OFF FLAPS
ALERT METHOD
600

610 — RECEIVE FMS DATA IDENTIFYING TAKE OFF RUNWAY

620 — DETERMINE AIRCRAFT POSITION

630 — DETERMINE ACTUAL FLAPS POSITION

635 — DETERMINE REQUIRED FLAPS SETTING BASED ON PREVAILING CONDITIONS

640 — OUTPUT TAKE OFF FLAPS ALERT WHEN AIRCRAFT IS ON TAKE OFF RUNWAY

650 — INHIBIT TAKE OFF FLAPS ALERT WHEN AIRCRAFT IS NOT ON TAKE OFF RUNWAY

FIG. 6

RUNWAY AWARENESS AND ALERTING SYSTEMS AND METHODS

TECHNICAL FIELD

The subject matter described herein relates to alerts and advisories provided to flight crew to enhance situational awareness around runways.

BACKGROUND

Runway Awareness and Advisory Systems (RAAS) are designed to improve flight crew situational awareness, thereby reducing the risks of runway incursion, runway confusion and runway excursions. Runway Awareness and Advisory Systems use airport data stored in an Enhanced Ground Proximity Warning System (EGPWS) database, coupled with GPS and other onboard sensors, to monitor the movement of an aircraft around the airport. It provides visual/aural annunciations at critical points, such as "Approaching Runway" and confirmation when an aircraft is lined up on the runway prior to takeoff: for example, "On Runway". In a scenario where a crew inadvertently lines up on a parallel taxiway and commences a take-off, an aural alert "On Taxiway, On Taxiway" is provided if the aircraft speed indicates imminent taking-off. On approach and after touchdown, RAAS systems may announce a distance to go until the end of the runway is reached.

Advisories/cautions are generated based upon the current aircraft position as compared to the location of the airport runways, which are stored within an EGPWS Runway Database.

Aural alerts can be grouped into two categories:

Routine Advisories (annunciations the flight crew will hear during routine operations) and Non-Routine Advisories/Cautions (annunciations the flight crew will seldom or perhaps never hear). RAAS provides the flight crew with 'routine advisories'. Exemplary advisories are:

Approaching Runway—Airborne: advisory provides the crew with awareness of which runway the aircraft is lined up with on approach;

Approaching Runway—On-Ground: advisory provides the flight crew with awareness of approximate runway edge being approached by the aircraft during taxi operations; On Runway: advisory provides the crew with awareness of which runway the aircraft is lined-up with;

Distance Remaining advisories enhance crew awareness of aircraft along-track position relative to the runway end; and Runway End: advisory is intended to improve flight crew awareness of the position of the aircraft relative to the runway end during low visibility conditions.

In addition, RAAS may provide the flight crew with several 'non-routine' advisories/cautions. These annunciations are designed to enhance safety and situational awareness in specific situations not routinely encountered during normal aircraft operations. Some of the RAAS advisories include distance information. The unit of measure used for distance can be configured to be either metres or feet. Exemplary non-routine advisories include:

Approaching Short Runway—Airborne: advisory provides the crew with awareness of which runway the aircraft is lined-up with, and that the runway length available may be marginal for normal landing operations. If desired, an additional caution annunciation can be enabled which provides the crew with awareness that the issue has not been resolved when the aircraft is on final approach;

Insufficient Runway Length—On-Ground: advisory provides the crew with awareness of which runway the aircraft is lined-up with, and that the runway length available for takeoff is less than the defined minimum takeoff runway length. If desired, an additional caution annunciation can be enabled which provides the crew with awareness that the issue has not been resolved when the aircraft continues takeoff;

Extended Holding on Runway: advisory provides crew awareness of an extended holding period on the runway;

Taxiway Take-Off: advisory enhances crew awareness of excessive taxi speeds or an inadvertent take-off on a taxiway. If desired, this function can provide a caution annunciation in lieu of an advisory annunciation;

Distance Remaining: advisories provide the flight crew with position awareness during a Rejected Take Off (RTO);

Taxiway Landing: alert provides the crew with awareness that the aircraft is not lined up with a runway at low altitudes;

In addition to the aural annunciations provided, visual caution indications may be activated if the appropriate criteria are met. Such visual indications may be in text form, overlaid on a terrain display. The various visual outputs of the RAAS system are, generally, included on a terrain display, which is a display generated using GPS location data and a terrain database including topographical data. A position of the aircraft is shown along with surrounding terrain. The display may be a Multi-Function Display (MFD) of the aircraft.

RAAS visual and aural alerts may not always be appropriate or necessary in some contexts. Generally, aircraft operations around the airport (e.g. including landing, takeoff and taxiing operations) are among the most mentally taxing part of a flight for the flight crew. Accordingly, it is desirable to avoid nuisance alerts and advisories. Opportunities may also exist to further integrate the RAAS systems with other avionics systems of an aircraft in order to provide contextually enhanced, further refined or new alerts and advisories.

Accordingly, it is desirable to provide methods and systems to improve situational awareness concerning operations around an airport that are sensitive to operational context. Furthermore, other desirable features and characteristics of the present invention will become apparent from the subsequent detailed description and the appended claims, taken in conjunction with the accompanying drawings and the foregoing technical field and background.

BRIEF SUMMARY

In one aspect, there is a runway awareness and advisory system (RAAS) for an aircraft. The RAAS including an output device and a processor in operable communication with the output device. The processor is configured to execute program instructions to: receive flight plan data including an expected runway from a Flight Management System (FMS); receive position data for the aircraft from a sensor system of the aircraft; pick a relevant runway based at least on the position data; compare the relevant runway with the expected runway to provide a comparison result; determine whether the aircraft is taking off based on data from the sensor system; output, by the output device, an approaching intersecting runway advisory message when the comparison result indicates the relevant runway and the expected runway do not match, the aircraft is determined not to be taking off and the position data for the aircraft indicates an approaching intersecting runway; and inhibit the approaching intersecting runway advisory message when the aircraft is determined to be taking off, the comparison result indicates the relevant runway and the expected runway match and the position data for the aircraft indicates an approaching intersecting runway. The aircraft is determined to be located on the relevant runway and substantially aligned therewith when picking the relevant runway.

In embodiments, determining whether the aircraft is taking off is based on data from the sensor system including determining whether the aircraft is taking off based on engine data or throttle position data from the sensor system.

In embodiments, picking a relevant runway based at least on the position data includes picking the relevant runway based on a comparison of runway location with aircraft position and runway heading and aircraft heading, wherein runway heading and runway location is obtained from an airport mapping database and aircraft position and aircraft heading is derived from the sensor system.

In embodiments, whether the aircraft is determined to be approaching an intersecting runway is determined based on a comparison of the position data representing a position of the aircraft and a hold line position and intersecting runway location obtained from an airport mapping database.

In embodiments, the approaching intersecting runway advisory message is output audibly through an aural output system and/or visually through a display system.

In embodiments, the approaching intersecting runway advisory message is output visually on an airport moving map of the display system.

In another aspect, there is a runway awareness and advisory system (RAAS) for an aircraft. The RAAS includes an output device and a processor in operable communication with the output device. The processor is configured to execute program instructions to: receive flight plan data including an expected runway from a Flight Management System (FMS), receive position data for the aircraft from a sensor system of the aircraft, pick a relevant runway based at least on the position data, receive required runway length data from the FMS, receive available runway length data, compare the relevant runway with the expected runway to provide a comparison result, determine whether the aircraft is taking off based on data from the sensor system, output a short runway message when, at least in part, the comparison result indicates the relevant runway and the expected runway match, the aircraft is determined to be taking off and a difference between the required runway length and the available runway length is indicative of a short runway, inhibit the short runway message when, at least in part, the aircraft is determined not to be taking off.

In embodiment, outputting the short runway message includes providing the runway message as part of an airport moving map (AMM) display.

In embodiments, outputting the short runway message includes graphically coding the runway message as part of a feature of an airport moving map (AMM) display.

In embodiments, the feature is a runway outline or a runway label.

In embodiments, the coding includes color coding.

In embodiments, the required runway length is calculated by the FMS based at least on aircraft weight.

In embodiments, inhibiting the short runway message is based at least in part on the aircraft being determined not to be taking off and the aircraft is not on the expected runway.

In embodiments, a required runway landing length is calculated by the FMS based at least on aircraft weight and an airborne short runway message is output when, at least in part, a comparison of the required runway length and an available runway length for a destination runway indicates a short destination runway.

In another aspect, there is a runway awareness and advisory system (RAAS) for an aircraft. The RAAS includes an output device, and a processor in operable communication with the output device. The processor is configured to execute program instructions to: receive airport map data from an airport mapping database including an identification of taxiways and runways; receive position data for the aircraft from a sensor system of the aircraft; determine whether the aircraft is on ground and located on a taxiway or in air and aligned with a taxiway based on the position data and the airport map data; determine whether the aircraft is taking off or on final approach based on data from the sensor system; output, by the output device, a taxiway take-off or approaching taxiway message when the aircraft is determined to be taking off or on final approach and when the aircraft is determined to be located on the taxiway or aligned with the taxiway respectively.

In embodiments, the airport map data includes three-dimensional position of the taxiways. The airport map data may also include position and dimensions data of the runways and taxiways and data describing other fixed features of an airport including runway and taxiway markings, buildings, aprons, runway and taxiway identifiers, aircraft aprons, signs, etc.

In embodiments, the approaching taxiway message is output when the aircraft is aligned with the taxiway, is within a predetermined distance of the taxiway and is below a predetermined elevation.

In embodiments, the airport moving map display is generated based on the airport map data including depiction of the taxiways and the runways and wherein the taxiway take-off or approaching taxiway message includes a color coded feature associated with the taxiway.

In embodiments, the color coded feature is a runway outline or a runway identifier.

In embodiments, the program instructions are configured to cause the processor to determine the correct runway for take-off or landing based on data from a Flight Management System (FMS) and to distinguishably color code the correct runway.

BRIEF DESCRIPTION OF THE DRAWINGS

Embodiments of the subject matter will hereinafter be described in conjunction with the following drawing figures, wherein like numerals denote like elements, and:

FIG. 2 is a flowchart of a method of providing an on ground approaching runway advisory, in accordance with an embodiment;

FIG. 3 is a flowchart of a method of providing a runway occupancy advisory, in accordance with an embodiment;

FIG. 4A is a flowchart of a method of providing a short runway alert, in accordance with an embodiment;

FIG. 6 is a flowchart of a method of providing a take-off flaps alert, in accordance with an embodiment;

DETAILED DESCRIPTION

Embodiments of the subject matter described herein provide methods and systems that integrate data and functionality from a plurality of previously federated aircraft systems in order to provide enhanced, and operationally contextual, RAAS systems and methods. In embodiments, data from a Flight Management System (FMS) is combined with EGPWS data and functionality to produce new and improved RAAS alerts. In some embodiments described herein, the RAAS visual alerts are audibly and visually output. Some examples provide output alerts that are included in an Airport Moving Map (AMM display). Alerts and advisories described herein include:

an approaching runway advisory—on ground: this advisory is output when an aircraft is approaching a runway but is inhibited for intersecting runways when the aircraft is on an FMS planned departure runway and data from aircraft sensors indicate that take-off is in progress;

a wrong runway occupancy advisory: this advisory is output when an FMS planned runway is different from an EGPWS picked runway and data from aircraft sensors indicate that take-off is in progress. Visual advisories may be provided to indicate correct and wrong runways based on a comparison of FMS and EGPWS runways;

a short runway alert-on ground: this advisory is output when the aircraft is on the planned FMS departure runway and aircraft sensors indicate that take-off is in progress. An adaptive short runway calculation may provide an available runway margin based on Take Off and Landing Data (TOLD) from the FMS rather than using a static, nominal value. Furthermore, visual short runway advisories may be included on an AMM display;

a taxiway take-off alert: this alert is output when AMM data, which includes taxiways in addition to runways, indicates that the aircraft is located on a taxiway and aircraft sensors indicate that take-off is in progress;

an approaching wrong runway advisory—airborne: this advisory is output when the aircraft is in the final approach and the EGPWS picked runway and the FMS planned arrival runway are in disagreement. Visual approaching wrong runway advisories may be provided on an AMM display; and a short runway alert—airborne: this alert is output when an available runway distance is less than a TOLD calculated required runway length. The short runway advisory may also be displayed in an AMM.

Figure 1:
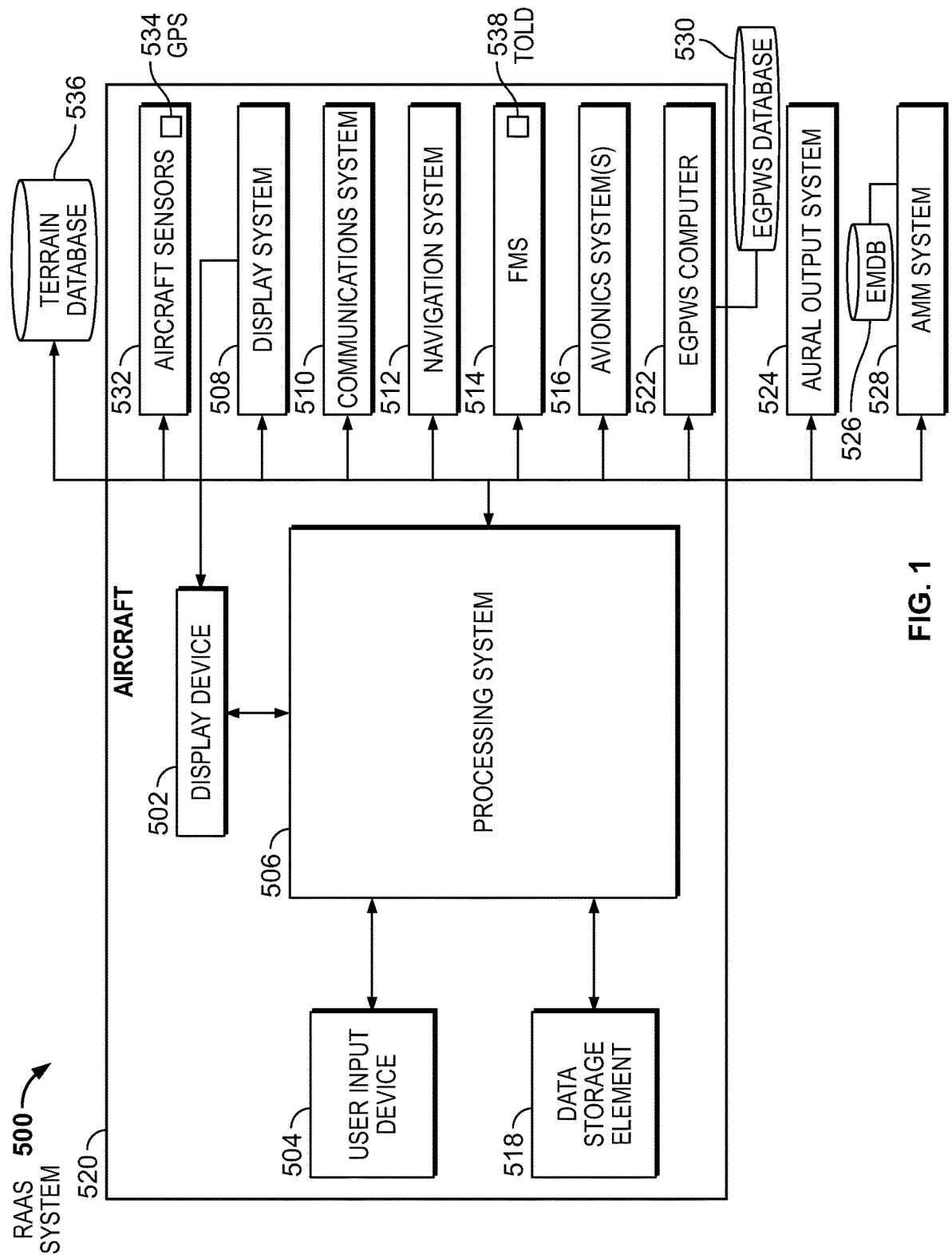
FIG. 1 depicts an exemplary embodiment of an aircraft system suitable for implementing RAAS systems and methods.

FIG. 1 depicts an exemplary embodiment of an RAAS system 500 suitable for implementing enhanced RAAS advisories and alerts as described further herein. The illustrated RAAS system 500 includes, without limitation, a display device 502, one or more user input devices 504, a processing system 506, a communications system 510, a navigation system 512, a flight management system (FMS) 514, one or more avionics systems 516, and a data storage element 518 suitably configured to support operation of the system 500. Further, the RAAS system includes a terrain database 536, aircraft sensors 532 including a Global Positioning System (GPS) 534, an EGPWS computer (522) associated with an EGPWS database 530, an aural output system 524 and an AMM system 528 associated with an airport mapping database (AMDB).

In exemplary embodiments, the display device 502 is realized as an electronic display capable of graphically displaying flight information or other data associated with operation of the aircraft 520 under control of the display system 508 and/or processing system 506. In this regard, the display device 502 is coupled to the display system 508 and the processing system 506, wherein the processing system 506 and the display system 508 are cooperatively configured to display, render, or otherwise convey one or more graphical representations or images associated with operation of the aircraft 520 on the display device 502. The user input device 504 is coupled to the processing system 506, and the user input device 504 and the processing system 506 are cooperatively configured to allow a user (e.g., a pilot, co-pilot, or crew member) to interact with the display device 502 and/or other elements of the system 500, as described herein. Depending on the embodiment, the user input device(s) 504 may be realized as a keypad, touchpad, keyboard, mouse, touch panel (or touchscreen), joystick, knob, line select key or another suitable device adapted to receive input from a user. In some embodiments, the user input device 504 includes or is realized as an audio input device, such as a microphone, audio transducer, audio sensor, or the like, that is adapted to allow a user to provide audio input to the system 500 in a "hands free" manner without requiring the user to move his or her hands, eyes and/or head to interact with the system 500.

The processing system 506 generally represents the hardware, software, and/or firmware components configured to facilitate communications and/or interaction between the elements of the RAAS system 500, as described herein. Depending on the embodiment, the processing system 506 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 506 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 506 includes processing logic that may be configured to carry out the functions, techniques, and processing tasks associated with the operation of the RAAS system 500, as described herein. Furthermore, the steps of a method or algorithm described in connection with the embodiments disclosed herein (particularly with respect to the methods of FIGS. 2 to 7) may be embodied directly in hardware, in firmware, in a software module executed by the processing system 506, or in any practical combination thereof. For example, in one or more embodiments, the processing system 506 includes or otherwise accesses a data storage element 518 (or memory), which may be realized as any sort of non-transitory short- or long-term storage media capable of storing programming instructions for execution by the processing system 506. The code or other computer-executable programming instructions, when read and executed by the processing system 506, cause the processing system 506 to support or otherwise perform certain tasks, operations, and/or functions described herein in the context of generating RAAS advisories and alerts. Depending on the embodiment, the data storage element 518 may be physically realized using RAM memory, ROM memory, flash memory, registers, a hard disk, or another suitable data storage medium known in the art or any suitable combination thereof.

The display system 508 generally represents the hardware, software, and/or firmware components configured to control the display and/or rendering of one or more navigational maps and/or other displays pertaining to operation of the aircraft 520 and/or onboard systems 510, 512, 514, 516 on the display device 502. In this regard, the display system 508 may access or include one or more databases suitably configured to support operations of the display system 508, such as, for example, the terrain database 536, an obstacle database, a navigational database, a geopolitical database, a terminal airspace database, the AMDB 526, the EGPWS airport database, a special use airspace database, or other information for rendering and/or displaying navigational maps and/or other content on the display device 502.

Still referring to FIG. 1, in an exemplary embodiment, the processing system 506 is coupled to the navigation system 512, which is configured to provide real-time navigational data and/or information regarding operation of the aircraft 520. The navigation system 512 may be realized by including a global navigation satellite system (e.g., including the GPS 534, a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 512, as will be appreciated in the art. The navigation system 512 is capable of obtaining and/or determining the instantaneous position of the aircraft 520, that is, the current (or instantaneous) location of the aircraft 520 (e.g., the current latitude and longitude) and the current (or instantaneous) altitude or above ground level for the aircraft 520. The navigation system 512 is also capable of obtaining or otherwise determining the heading of the aircraft 520 (i.e., the direction the aircraft is traveling in relative to some reference). In the illustrated embodiment, the processing system 506 is also coupled to the communications system 510, which is configured to support communications to and/or from the aircraft 520. For example, the communications system 510 may support communications between the aircraft 520 and air traffic control or another suitable command center or ground location. In this regard, the communications system 510 may be realized using a radio communication system and/or another suitable data link system.

In an exemplary embodiment, the processing system 506 is also coupled to the FMS 514, which is coupled to the navigation system 512, the communications system 510, and one or more additional avionics systems 516 to support navigation, flight planning, and other aircraft control functions in a conventional manner, as well as to provide real-time data and/or information regarding the operational status of the aircraft 520 to the processing system 506.

Although FIG. 1 depicts a single avionics system 516, in practice, the RAAS system 500 and/or aircraft 520 will likely include numerous avionics systems for obtaining and/or providing real-time flight-related information that may be displayed on the display device 502 or otherwise provided to a user (e.g., a pilot, a co-pilot, or crew member). For example, practical embodiments of the RAAS system 500 and/or aircraft 520 will likely include one or more of the following avionics systems suitably configured to support operation of the aircraft 520: a weather system, an air traffic management system, a radar system, a traffic avoidance system, an autopilot system, an autothrust system, a flight control system, hydraulics systems, pneumatics systems, environmental systems, aircraft systems, engine systems, trim systems, lighting systems, crew alerting systems, electronic checklist systems, an electronic flight bag and/or another suitable avionics system. In various embodiments, the processing system 506 may obtain information pertaining to the current location and/or altitude of the aircraft 520 and/or other operational information characterizing or otherwise describing the current operational context or status of the aircraft 520 from one or more of the onboard systems 508, 510, 512, 514, 516.

It should be understood that FIG. 1 is a simplified representation of the RAAS system 500 for purposes of explanation and ease of description, and FIG. 1 is not intended to limit the application or scope of the subject matter described herein in any way. It should be appreciated that although FIG. 1 shows the various elements of the system 500 being located onboard the aircraft 520 (e.g., in the cockpit), in practice, one or more of the elements of the system 500 may be located outside the aircraft 520 (e.g., on the ground as part of an air traffic control center or another command center) and communicatively coupled to the remaining elements of the RAAS system 500 (e.g., via a data link and/or communications system 510). For example, in some embodiments, the data storage element 518 may be located outside the aircraft 520 and communicatively coupled to the processing system 506 via a data link and/or communications system 510. Furthermore, practical embodiments of the RAAS system 500 and/or aircraft 520 will include numerous other devices and components for providing additional functions and features, as will be appreciated in the art. In this regard, it will be appreciated that although FIG. 1 shows a single display device 502, in practice, additional display devices may be present onboard the aircraft 520. Additionally, it should be noted that in other embodiments, features and/or functionality of processing system 506 described herein can be implemented by or otherwise integrated with the features and/or functionality provided by the FMS 514. In other words, some embodiments may integrate the processing system 506 with the FMS 514. In yet other embodiments, various aspects of the subject matter described herein may be implemented by or at an electronic flight bag (EFB) or similar electronic device that is communicatively coupled to the processing system 506 and/or the FMS 514.

The EGPWS database 530 includes, in some embodiments, a worldwide terrain database of varying degrees of resolution, an obstacles database containing cataloged man-made objects 100 feet or greater in height in regions around the world, a worldwide airport database containing information on runways 3500 feet or longer in length, and an envelope modulation database containing information on airport approach and departure profiles to support an envelope modulation feature. The terrain database 536 contains higher resolution grids for airport areas in view of the fact that aircraft operate in close proximity to terrain near an airport, and to address prevention of airport runway/taxiway incursions. Lower resolution grids are used outside airport areas where terrain feature detail is less important to the flight crew. With the use of accurate GPS 534 or FMS 514 information for the location of the aircraft 520 (which may be provided indirectly via the navigation system 512), the EGPWS computer 522 receives present position, track, and ground speed. With this information and data from the EGPWS database 530, the EGPWS computer 522 is able to present a graphical plan view of the aircraft 520 relative to the terrain and advise the flight crew of a potential conflict with the terrain or obstacle. The graphical plan view is provided via the display system 508 and includes a terrain display. Conflicts are recognized and alerts provided when terrain violates specific computed envelope boundaries on the projected flight path of the aircraft. Alerts may be provided in the form of visual light annunciation of a caution or warning, audio annunciation based on the type of conflict via the aural output system 524, and color enhanced visual display of the terrain or obstacle relative to the forward look of the aircraft via the display system 508. The terrain display may be provided on a Weather Radar Indicator, an Electronic Flight Information System (EFIS) display, or a dedicated EGPWS display and may or may not be displayed automatically. Also available with high integrity GPS data is alerting advisory information to help prevent runway/taxiway incursions in the form of audio advisory alerts. The functionality of the EGPWS computer 522 is vast and will not be described in further detail herein except to the extent required to understand the features of the RAAS system 500 of the present disclosure and the associated methods.

The EGPWS computer 522 utilizes EGPWS data from the EGPWS database 530 to provide RAAS alerts and advisories. The RAAS alerts and advisories increase crew situational awareness during operations on and around airports. Prior RAASs were reliant on location data from the GPS 534 or the navigation system 512 and data from the EGPWS database 530 and provided audio-only advisories and caution alerts of position during ground operations and approach to landing via the aural output system 524. Optionally, RAAS visual textual messages were included as an overlay on the dedicated terrain display. The present disclosure extends RAAS visual outputs to coded graphical symbology integrated into the terrain display and/or into an AMM display. Yet further, the present disclosure connects the EGPWS computer 522 to FMS flight plan data and AMDB data and adds software functionality to enhance context sensitivity of the various aural and visual alerts and advisories.

The EGPWS computer 522 includes a runway picker module configured to determine which runway the aircraft is on when the aircraft 520 is on the ground or which runway the aircraft is lined up with when the aircraft 520 is in the air. In one embodiment, the runway is picked based on a comparison of aircraft heading and runway heading and location of the aircraft and location of the runway. The runway location and heading is data included in the EGPWS database 530. In embodiments, the aircraft heading should be within 20 degrees of the runway heading and the aircraft location matches the runway location to determine that the aircraft is travelling along the runway. In the air, the aircraft 520 should be within 200 feet plus the runway width of a runway centerline in order to be picked as an aligned target runway. The runway length, width and the runway centerline are data obtainable from the EGPWS database. Aircraft heading and position information can be derived from data from the aircraft sensors 532 or via the FMS 514 and the navigation system 512.

The processing system 506 is configured, in various embodiments of the present disclosure, to determine whether the aircraft is taking off. One way to make such a determination is to compare the speed of the aircraft 520, which is available from the navigation system 512, with a threshold that is set so as to be inconsistent with any other aircraft operation than taking off. For example, a speed threshold of 40 kts could be used. In another exemplary method for determining whether the aircraft is taking off, an engine parameter such as engine power or throttle position is obtained and that parameter is compared to a threshold indicative of when the aircraft is in the process of taking off. Any sensed parameter of the aircraft sensors 532 that is indicative of engine take-off power or setting can be used and more than one such parameter can be used in combination.

The AMM system 528 is configured to generate a 2-D Airport Moving Map (AMM) and/or a 3D Airport Moving Map (AMM) based on data received from the Airport Mapping Database 526 (AMDB). The AMDB 526 provides detailed information on the ground surroundings of an airport including runways, taxiways, airport structures, signs, taxiway lines, airport buildings, etc. The AMM system 528 generates a synthetic display of the airport including the various structures, runways, taxiways and markings at an airport allowing taxiing at unfamiliar airports easier by increasing the pilot's situational awareness. The 2D or 3D AMMs may be displayed on a multi-functional display (MFD), primary flight display (PFD), electronic flight bag (EFB) or interactive navigation display (iNAV) of the display system 508. 3D AMMs may be included as part of a Synthetic Vision System (SVS) on the PFD. The SVS environment display provides a 3D rendering of the airport environment. The 3D AMMs option can be used to complement the 2D moving maps feature on the multifunction display, or as a standalone tool. The following information obtained from the AMDB 526 can be included in the AMM displays: runways and runway boundaries, taxiways, center lines, color-coded center lines, intermediate holding positions, runway holding positions, ATC clearance points, terminal gates, de-icing areas, hot spots, construction areas, frequency areas, wind direction indicators, apron labels, runway labels (e.g. an alphanumeric runway identifier), taxiway labels (e.g. an alphanumeric taxiway identifier) and other enhanced details like terminals, hangars, control tower, fire stations, etc.

The processing system 506 generally represents the hardware, software, and/or firmware components (or a combination thereof), which is communicatively coupled to the various elements of the RAAS system 500 and configured to support the RAAS methods and features described herein, particularly with respect to the methods described with respect to the flow charts of FIGS. 2 to 7. Depending on the embodiment, the processing system 506 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 506 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 506 may include processing logic that may be configured to carry out the functions, techniques, and processing tasks associated with the operation of the RAAS system 500, as described in greater detail below with respect to FIGS. 2 to 7. Furthermore, the steps of a method or algorithm described in connection with the embodiments disclosed herein may be embodied directly in hardware, in firmware, in a software module executed by the processing system 506, or in any practical combination thereof. In the illustrated embodiment, the processing system 506 includes or otherwise accesses the data storage element 518 (or memory) capable of storing code or other computer-executable programming instructions that, when read and executed by the processing system 506, cause the processing system 506 to performs certain tasks, operations, functions, and/or processes described herein with respect to FIGS. 2 to 7.

Figure 17:
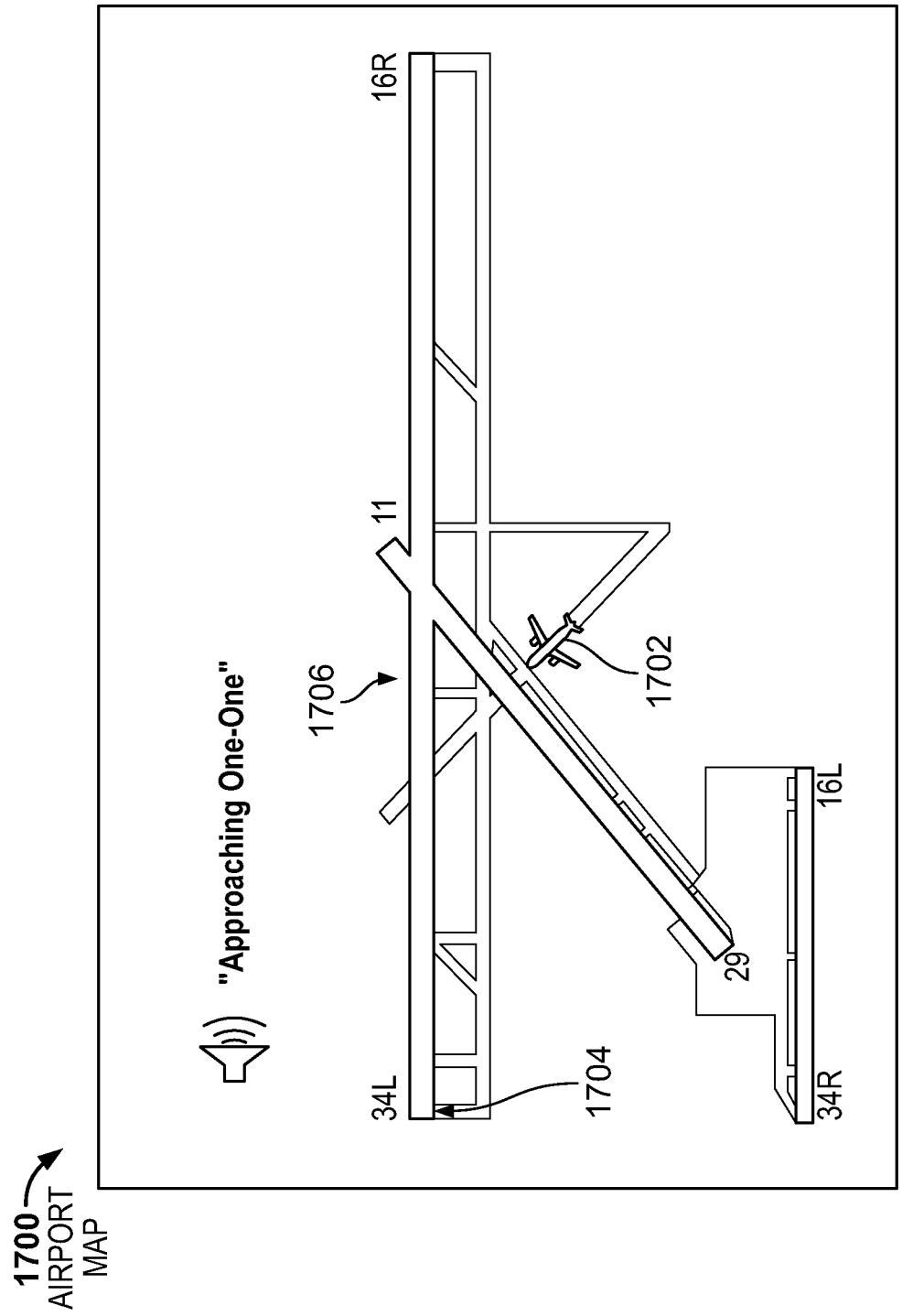
FIG. 17 provides a schematic illustration of an airport map.

A flow chart of an exemplary method 100 of generating an on-ground approaching runway advisory is disclosed in FIG. 2. In prior systems, the approaching runway advisory would be issued when the following conditions were met: (1) aircraft is on the ground, (2) aircraft ground speed is less than 40 knots, and (3) aircraft is within a specified distance from the runway. However, there are situations where such an advisory can be considered to be a nuisance advisory and may be distracting to the flight crew. Consider an example airport map 1700 as shown in FIG. 17 and an aircraft located on runway 34L-16R at a position heading in the direction of 34L to 16R. The aircraft is preparing for taking off but may not yet pass a take off speed threshold like 40 knots. In such a case, the flight crew would be provided with an approaching runway advisory that may not be necessary. According to the present disclosure, the planned FMS runway is included as part of the advisory conditions to inhibit approaching runway advisories when on the planned runway. In method step 110, the departure runway is obtained from flight plan data from the FMS 514. In method step 120, the aircraft position is determined using the navigation system 512. In step 130, a determination is made as to whether the aircraft is taking off. In embodiments, the determination of step 130 is performed using an engine parameter and/or throttle position rather than speed alone. The engine and throttle position may more accurately determine take off than aircraft speed in some situations. The engine and throttle position may be compared with predetermined values to determine whether take off is in progress. In step 140, the approaching runway advisory is output when the aircraft is determined not to be taking off. That is, the following conditions are required to output the approaching runway advisory: (1) the aircraft is on ground; (2) aircraft is determined not to be in process of taking off; and (3) aircraft is within a specified distance from an intersecting runway (which could vary as a function of groundspeed to allow earlier advisories for higher speeds). In step 150 the approaching runway advisory is inhibited when the aircraft is determined to be taking off or when the aircraft is determined not to be taking off and when the aircraft is positioned on the FMS planned departure runway. Referring back to FIG. 17, an aircraft located at 1702 and approaching the edge of the runway 11 will have a throttle position or engine setting that is not consistent with taking off and when the aircraft is within a specified distance of runway 11, the advisory "approaching runway one-one" will be output. When the aircraft is at the position shown by 1704 or 1706, the aircraft is determined to be taking off and the aircraft is on the planned departure runway. As such, the approaching runway advisory is inhibited. During take-off when an aircraft is heading down the planned departure runway, it may be potentially distracting to be advised of an approaching intersecting runway. An intersecting runway is one that crosses with the planned departure runway. In embodiments, the approaching runway advisory includes the type of advisory (approaching runway) and a runway identifier (e.g. 11). The approaching runway may be an aural advisory provided by the aural output system 524 and/or a visual advisory output by the display system 508. For example, the visual advisory may be included as a message on a terrain display and/or an AMM display. If the aircraft is determined to be taking off and the aircraft is determined not to be on the planned departure runway, a wrong runway take-off is determined, which results in a wrong runway message as described further herein.

In a further refinement, according to some embodiments, the specified distance of the third condition in step 140 (by which the aircraft is within a specified distance from the runway) is adaptively determined. That is, instead of using a fixed or nominal distance from the side or end edges of the runway to time when to output the approaching runway advisory, the processing system 506 retrieves hold line data from the AMDB. The hold line is located at a position corresponding to a hold line marking on a runway or taxiway indicating where the aircraft must stop when approaching a runway. Speed of the aircraft may also be factored in when determining the approaching runway advisory to ensure that the aircraft has sufficient capability to stop at the hold line.

A flow chart of an exemplary method 300 of generating a runway occupancy advisory is disclosed in FIG. 3. In prior systems, the runway occupancy advisory would be issued when the following conditions were met: (1) the aircraft enters onto a runway, and (2) the aircraft heading is within 20 degrees of the runway heading. However, there are situations where such an advisory can be considered to be potentially distracting to the flight crew. Consider an example airport map 1700 as shown in FIG. 17 and an aircraft located on runway 34L at a position 1704. The aircraft is on the proper runway and is preparing for taking off. According to the present disclosure, the planned FMS runway is included as part of the advisory conditions to inhibit a runway occupancy advisory when on the FMS planned runway. In method step 310, the departure runway is obtained from flight plan data from the FMS 514. In method step 320, the aircraft position is determined using the navigation system 512. In step 330, a determination is made as to whether the aircraft is taking off. In embodiments, the determination of step 330 is performed using an engine parameter and/or throttle position rather than speed. The engine and throttle position may more accurately determine take off than aircraft speed in some situations. The engine and throttle position may be compared with predetermined values to determine whether take off is in progress. In step 340, the runway occupancy advisory is output when the following conditions are met: (1) the aircraft enters onto a runway that is not the planned departure runway, (2) the aircraft heading is within 20 degrees of the runway heading, and (3) the aircraft is determined not to be taking off. In step 350, the runway occupancy advisory is inhibited when the aircraft is determined to be taking off and positioned on the FMS planned departure runway. The runway occupancy advisory may be an aural advisory provided by the aural output system 524 and/or a visual advisory output by the display system 508. For example, the visual advisory may be included as a message on a terrain display and/or an AMM display.

Figure 8:
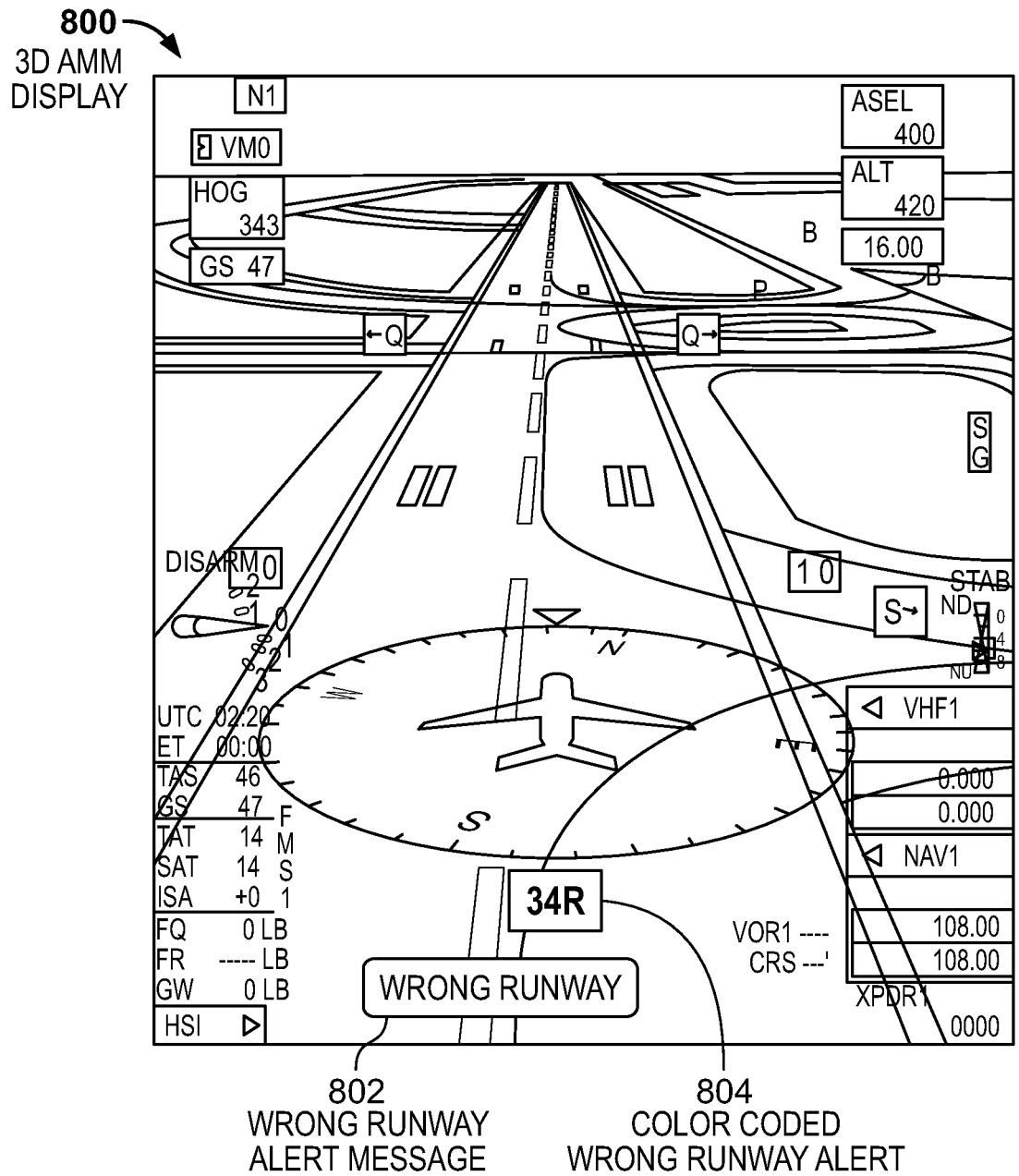
FIGS. 8 and 9 depict visual wrong runway alerts on an airport moving map, in accordance with exemplary embodiments.
Figure 9:
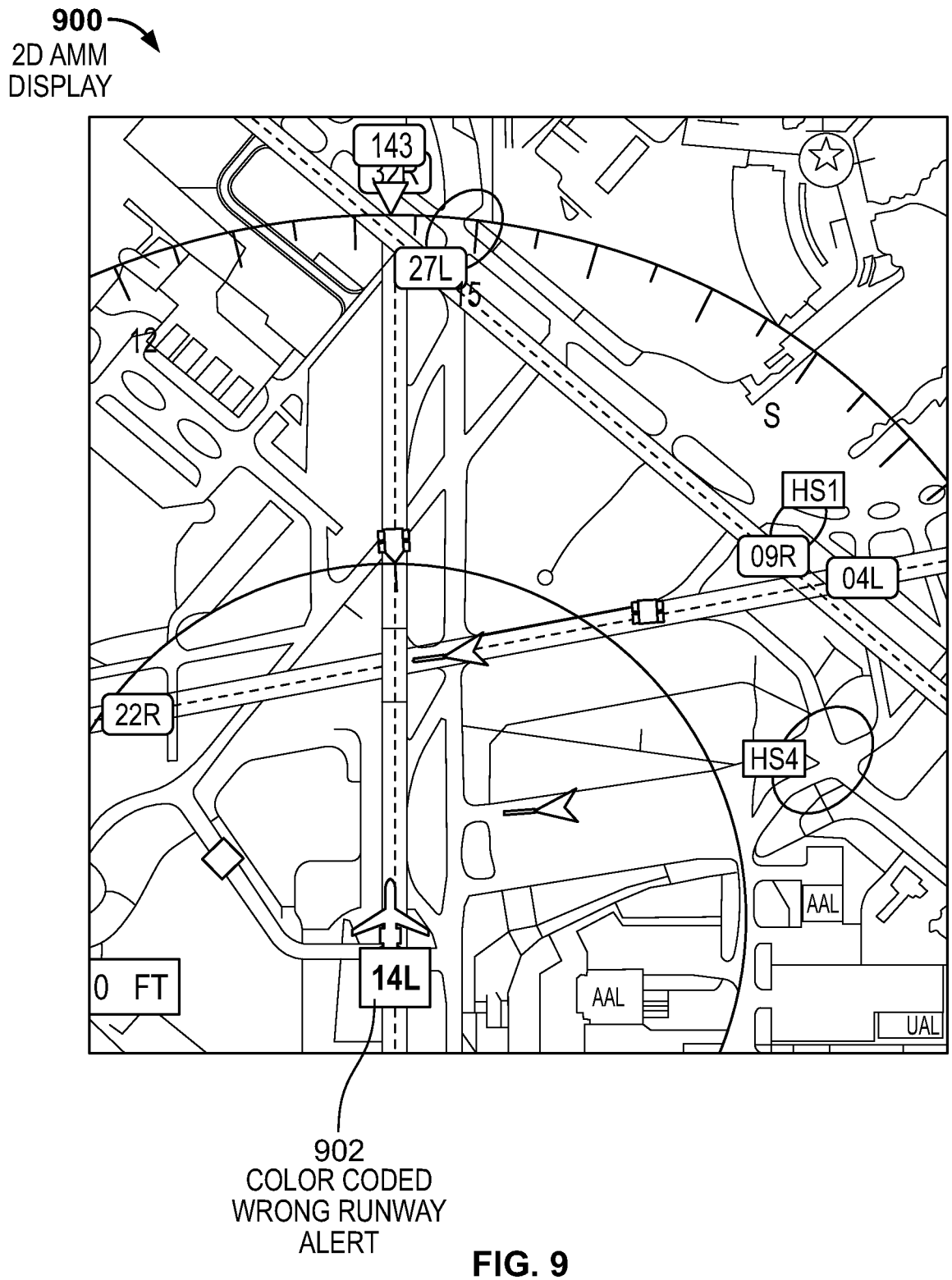

Referring to FIGS. 8 and 9, exemplary visual wrong runway alerts are illustrated as displayed on an AMM display. In FIG. 8, a 3D AMM display 800 is shown. The 3D AMM display 800 provides detailed information about airport features from an out of the window perspective, with airport features that are further away being scaled to be smaller to provide for perspective projection. When the aircraft is determined to be taking off in step 320, when the aircraft is determined to have a heading that is substantially aligned with a runway that is not the FMS planned departure runway and when the aircraft is not on the FMS planned departure runway, the 3D AMM display 800 (and/or a 2D AMM display) is augmented with a visual alert cautioning the flight crew about the wrong runway status in addition to the aural advisory of the current runway number (e.g. "on runway one-one"). The visual alerts can include text or a graphical symbol conveying a wrong runway message in the form of the wrong runway alert message 802. Additionally, or alternatively, the 3D AMM display 800 (and/or a 2D AMM display) includes a color coded wrong runway alert 804 when the conditions described with respect to FIG. 3 are met. In the exemplary embodiment of FIG. 8, the runway label (e.g. an alphanumeric identifier) includes graphical coloring (e.g. amber) that changes when the aircraft is determined to be taking off from a runway that is not the planned departure runway. A runway outline, a runway centerline or other airport feature associated with the runway in the 3D AMM display 800 could be color coded, in addition or in the alternative. Further, when the aircraft is determined to be taking off on the runway that agrees with the FMS departure runway, a different color coding (e.g. white) is selected for the color coded runway identifier 804. In this instance no message indicating a wrong runway is displayed. Yet further, the aural advisory of runway occupancy is suppressed. Referring to FIG. 9, an exemplary 2D AMM display 900 is shown, which includes a similar color coded wrong runway alert 902 that operates in the same way as the color coded wrong runway alert 804 of FIG. 8. A wrong runway alert message may also be overlayed on the 2D AMM display 900 in the form of a text description.

A flow chart of an exemplary method 400 of generating an on-ground short runway alert is depicted in FIG. 4A. In prior systems, the on-ground short runway alert would be issued when the following conditions were met: (1) conditions for an On-Runway Advisory are satisfied (as described above), and (2) available distance for takeoff is less than a defined nominal runway length. The defined nominal length is a predetermined value retrieved from an aircraft operator configuration file. However, there are situations where such an advisory can be considered to be a nuisance advisory. For example, the alert is not useful when the aircraft is back taxiing from mid-field on a runway and the flight crew does not plan to take-off from that runway. According to the present disclosure, the planned FMS runway is included as part of the alert conditions to inhibit short runway alerts when the aircraft is not on the planned departure runway and not taking-off from that runway. In method step 410, the departure runway is obtained from flight plan data from the FMS 514. In method step 420, the aircraft position is determined using the navigation system 512. In step 430, a determination is made as to whether the aircraft is taking off.

In embodiments, the determination of step 430 is performed using an engine parameter and/or throttle position rather than speed alone. The engine and throttle position may more accurately determine take off than aircraft speed in some situations. The engine and throttle position may be compared with predetermined values to determine whether take off is in progress. In step 440, the short runway alert is output when the aircraft is determined to be taking off on the planned departure runway. That is, the following conditions are required to output the short runway alert: (1) the aircraft is on the planned departure runway; (2) the aircraft is determined to be in process of taking off; (3) the aircraft has a heading that is substantially aligned with heading of the runway (e.g. within 20 degrees); and (4) the available runway length is less than the required runway length or the required runway length plus a safety margin. In step 450, the on-ground short runway alert is inhibited when the aircraft is determined not to be taking off and not to be on the planned departure runway according to the FMS 514, which would be the case during back-taxiing on a runway that is not the departure runway. For attempted take-off on a runway that is not the planned FMS runway, protection is provided by the wrong runway alert discussed earlier. The on-ground short runway alert may be an aural advisory provided by the aural output system 524 and/or a visual advisory output by the display system 508. For example, the visual advisory may be included as a message on a terrain display and/or an AMM display.

Figure 10:
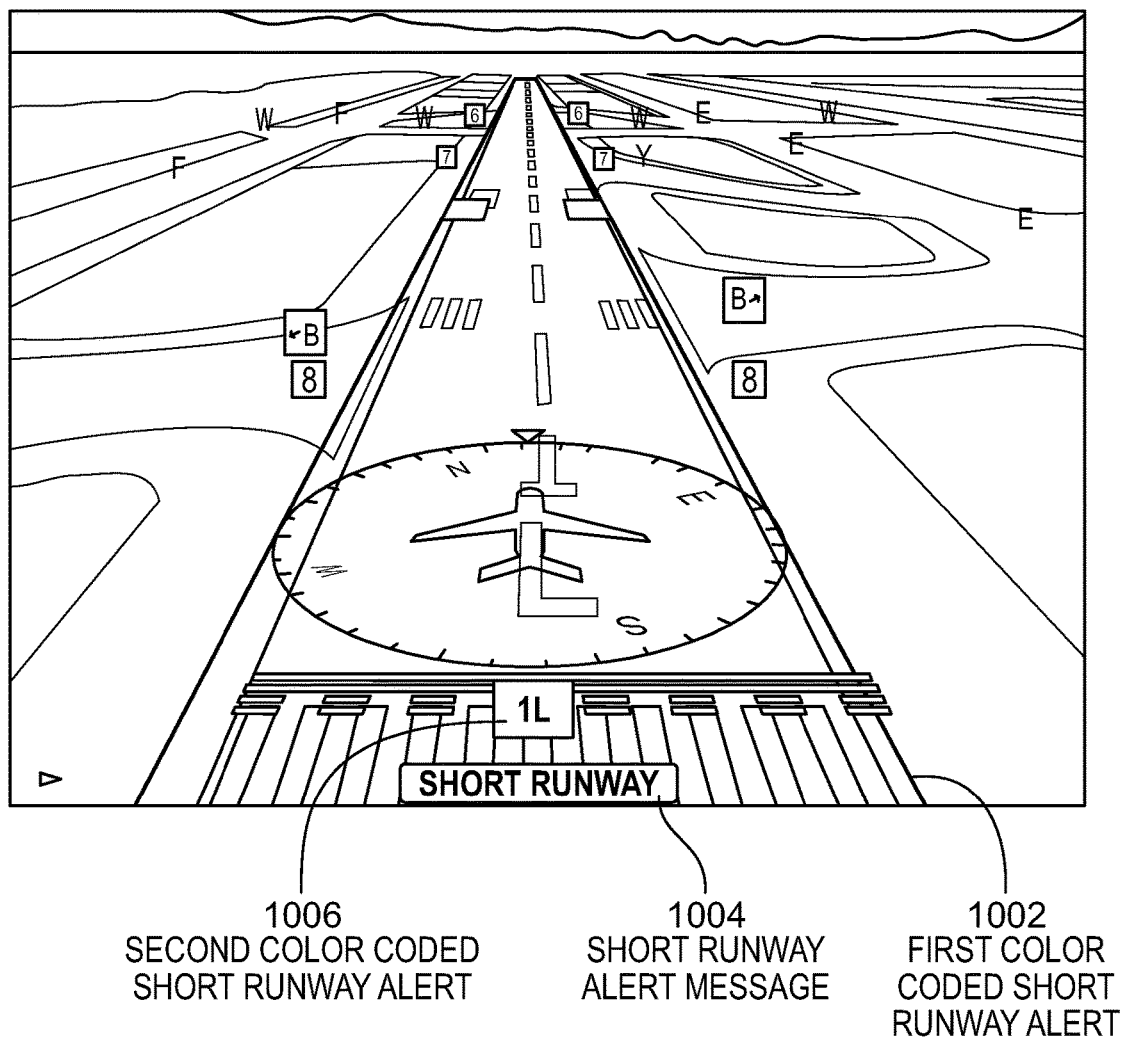
FIGS. 10, 11 and 12 depict visual on-ground short runway alerts on an airport moving map, in accordance with exemplary embodiments.
Figure 12:
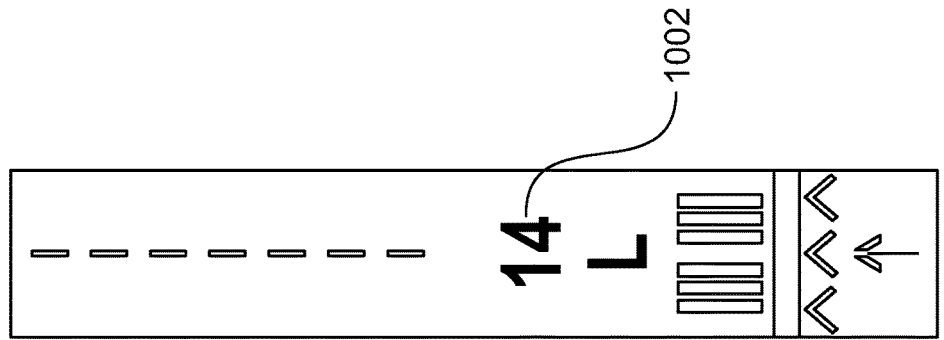
Figure 11:
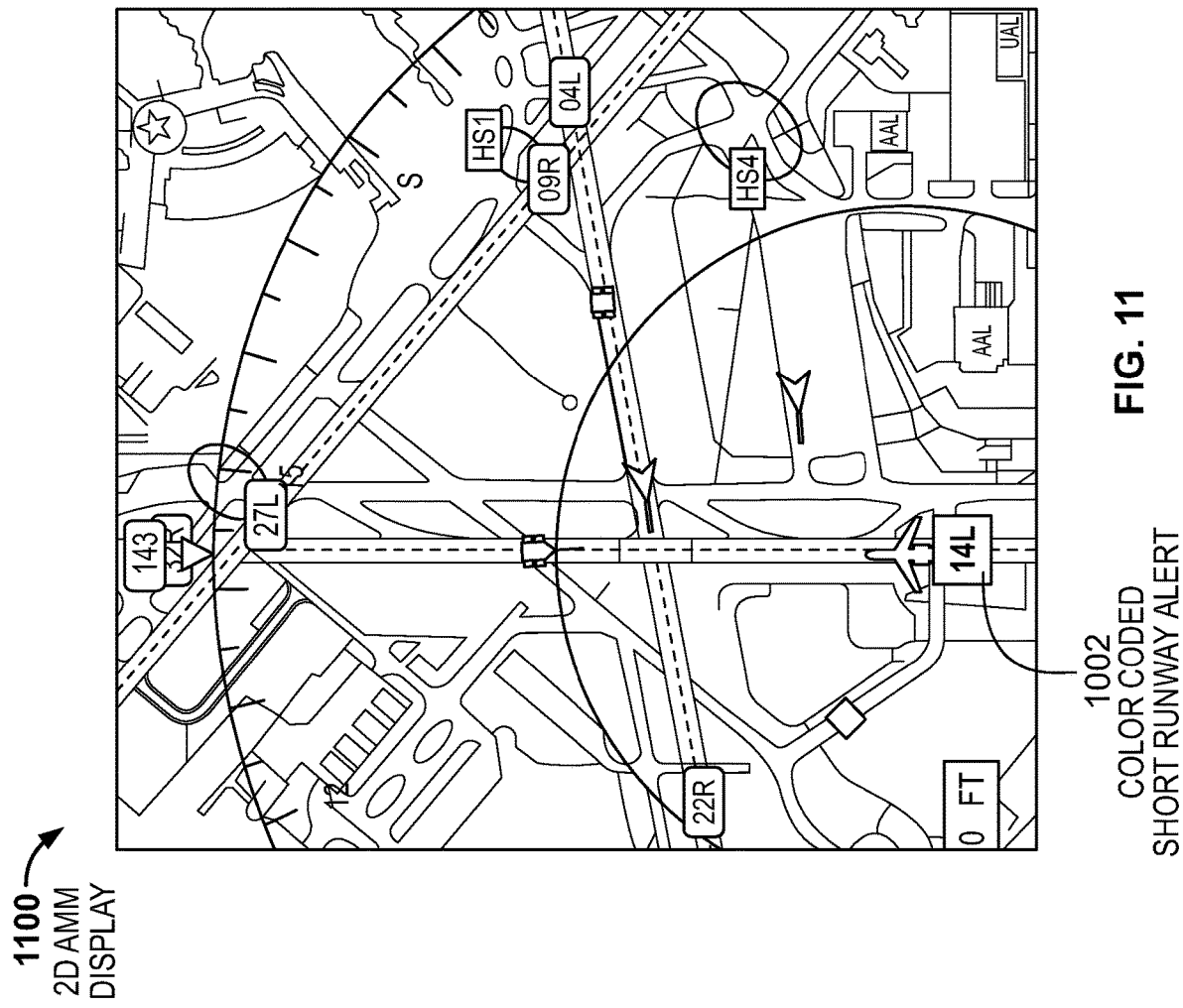

Referring to FIGS. 10, 11 and 12, exemplary visual short runway alerts are illustrated as displayed on an AMM display. In FIG. 10, a 3D AMM display 1000 is shown. The 3D AMM display 1000 provides detailed information about airport features from an out of the window perspective, with airport features that are further away being scaled to be smaller to provide for perspective projection. When the aircraft is determined to be taking off in step 420, when the aircraft is determined to have a heading that is substantially aligned with a runway that is the FMS planned departure runway, when the aircraft is located on the planned departure runway and when the runway is determined to be short, the 3D AMM display 1000 (and/or a 2D AMM display) is augmented with a visual alert cautioning the flight crew about the wrong runway status in addition to the aural advisory of the current runway identifier (e.g. "on runway one-one") and the amount of runway available/remaining. The visual alerts can include text or a graphical symbol conveying a short runway message in the form of the short runway alert message 1004. Additionally, or alternatively, the 3D AMM display 1000 (and/or a 2D AMM display) includes a first or second color coded short runway alert 1002, 1006 when the conditions described with respect to FIG. 4A are met. In the exemplary embodiment of FIG. 10, the runway label (e.g. an alphanumeric identifier) includes graphical coloring (e.g. amber) that changes when the aircraft is determined to be taking off from a runway that is the planned departure runway and is determined to be a short runway (as shown by the second color coded short runway alert 1006). A runway outline (as per the first color coded short runway alert 1002), a runway centerline or other airport feature associated with the runway in the 3D AMM display 1000 could be color coded, in addition or in the alternative. Further, when the aircraft is determined to be taking off on a short runway that does not agree with the FMS departure runway, the visual and aural short runway alerts are inhibited—the wrong runway alert is provided instead. Referring to FIG. 11, an exemplary 2D AMM display 1100 is shown, which includes a similar color coded short runway alert 1002 (see also the color coded short runway alert 1002 in FIG. 12) that operates in the same way as the color coded short runway alerts 1002, 1006 of FIG. 10. A short runway alert message describing the alert in text form may also be overlayed on the 2D AMM display 1100. The 2D AMM display 1100 provides a top down view of the airport (including detailed airport features) based on data from the AMDB 526.

In embodiments, the short runway alert described with respect to the flowchart of FIG. 4A may be determined based on an adaptively calculated required runway length. That is, a static nominal required runway length is not necessarily used. Instead, the FMS calculates the required runway length based on at least some of the following parameters: aircraft weight, wind, runway condition, runway slope, air temperature and altitude of airport. This calculation can be performed as part of determining TOLD information. The adaptively determined required runway length is compared to the available runway length in determining whether the runway is short.

Figure 4B:
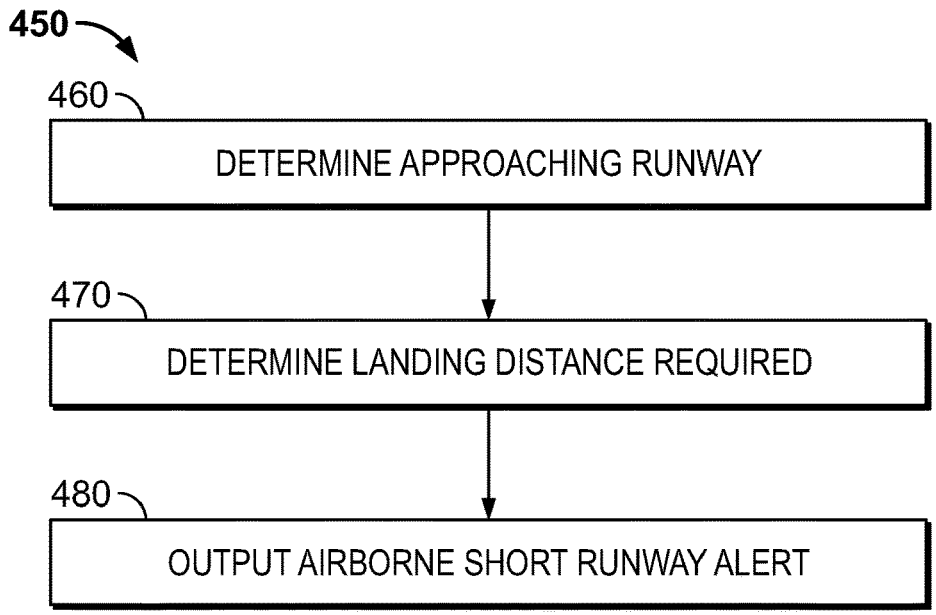
FIG. 4B is a flowchart of a method of providing an airborne short runway alert, in accordance with an embodiment.

A flow chart of an exemplary method 450 of generating an airborne short runway alert is depicted in FIG. 4B. In prior systems, the on-ground short runway alert would be issued when the following conditions were met: (1) the aircraft is sufficiently close to landing on the destination runway, (2) aligned runway is shorter than a nominal runway length, and (3) aircraft is in an elevation window above the destination runway. Condition (1) can be determined by the aircraft being between 750 feet and 300 feet above the airport elevation (AFE), the Aircraft is within 3 nautical miles (<3 NM) of the approach end of the runway, the aircraft track is aligned with the runway (aircraft track is within 20 degrees of the runway heading), and the aircraft position is within a variable distance laterally of the runway centerline. The required lateral distance is dynamically computed based on the current along track distance to the runway end and equals the runway width plus 100 Ft per NM of distance, limited to the runway width plus 200 Ft. That is, condition (1) requires the EGPWS computer 522 to pick the target runway for landing and to determined whether the aircraft is positionally (in three dimensions) within one or more thresholds of the target runway to issue a short runway message. Further, the runway is determined to be short based on a nominal length. The defined nominal length is a predetermined value retrieved from an aircraft operator configuration file. According to the present disclosure, the short runway status is determined with greater precision. Specifically, the approaching target runway is picked in step 460 and the landing distance required is calculated in step 470. Step 470 is determined based on an adaptively calculated required runway length. That is, a static nominal required runway length is not necessarily used. Instead, the FMS calculates the required runway length based on at least some of the following parameters: aircraft weight, wind, runway condition, runway slope, air temperature and altitude of airport. This calculation can be performed as part of determining TOLD information 538. The adaptively determined required runway length is compared to the available runway length in determining whether the runway is short. If the runway is determined to be short, visual and/or aural airborne short runway alerts are output in step 480.

Figure 14:
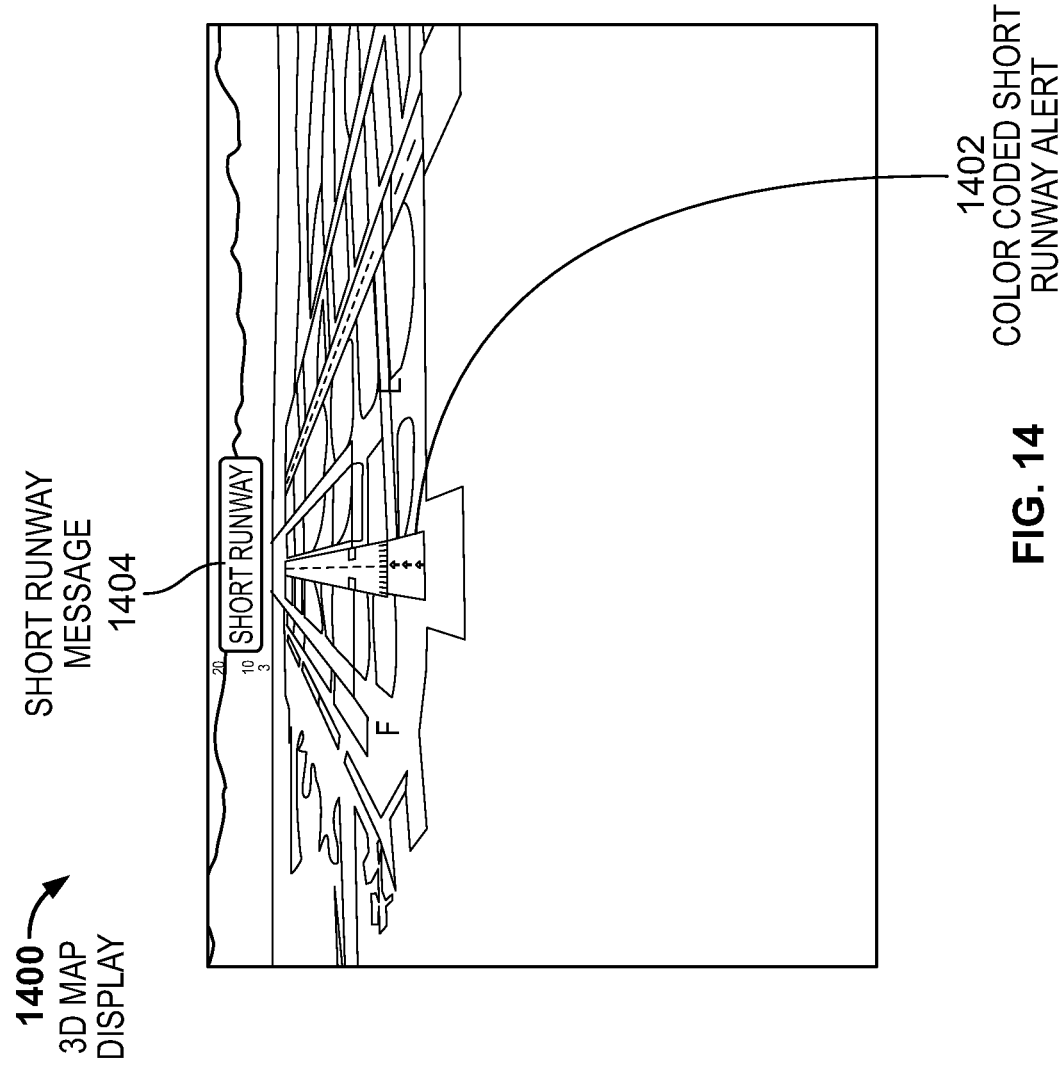
FIGS. 13 and 14 depict visual airborne short runway alerts, in accordance with exemplary embodiments.
Figure 13:
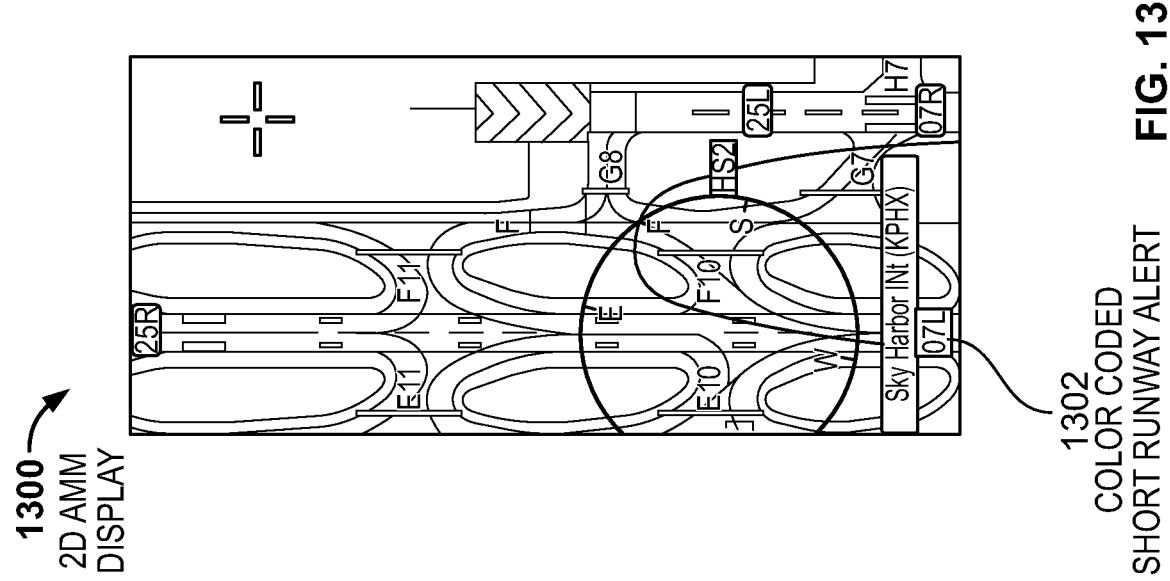

Referring to FIGS. 13 and 14, exemplary airborne visual short runway alerts are illustrated as displayed on an AMM display. In FIG. 13, a 2D map display 1300 is shown. The 2D map display 1300 provides a top down view of the airport based on AMDB data. The 2D map display 1300 may be a terrain display or a 2D AMM. When the short runway conditions described above are met, the 2D map display 1300 (and/or a 3D map display) is augmented with a visual alert cautioning the flight crew about the short runway status in addition to the aural advisory of the short runway status. The visual alerts can include text or a graphical symbol conveying a short runway. Additionally, or alternatively, the 2D map display 1300 (and/or a 3D map display) includes color coded short runway alert 1302 when the conditions described with respect to FIG. 4B are met. In the exemplary embodiment of FIG. 13, the runway label (e.g. an alphanumeric identifier) includes graphical coloring (e.g. amber) that changes when the aircraft is determined to be approaching a runway that is adaptively determined to be a short runway. A runway outline (as per the color coded short runway alert 1302), a runway centerline or other airport feature associated with the runway in the 2D map display 1300 could be color coded, in addition or in the alternative. Further, when the aircraft is determined to be a runway that is not considered to be short, the visual and aural short runway alerts are inhibited (e.g. the runway identifier is display in white rather than amber). Referring to FIG. 14, an exemplary 3D map display 1400 is shown, which includes a similar color coded short runway alert 1402 that operates in the same way as the color coded short runway alert 1302 of FIG. 13. A short runway alert message may also be overlayed on the 3D map display 1400, as shown by the text form short runway message 1404. The 3D map display 1400 provides an out of the window perspective view.

Figure 5:
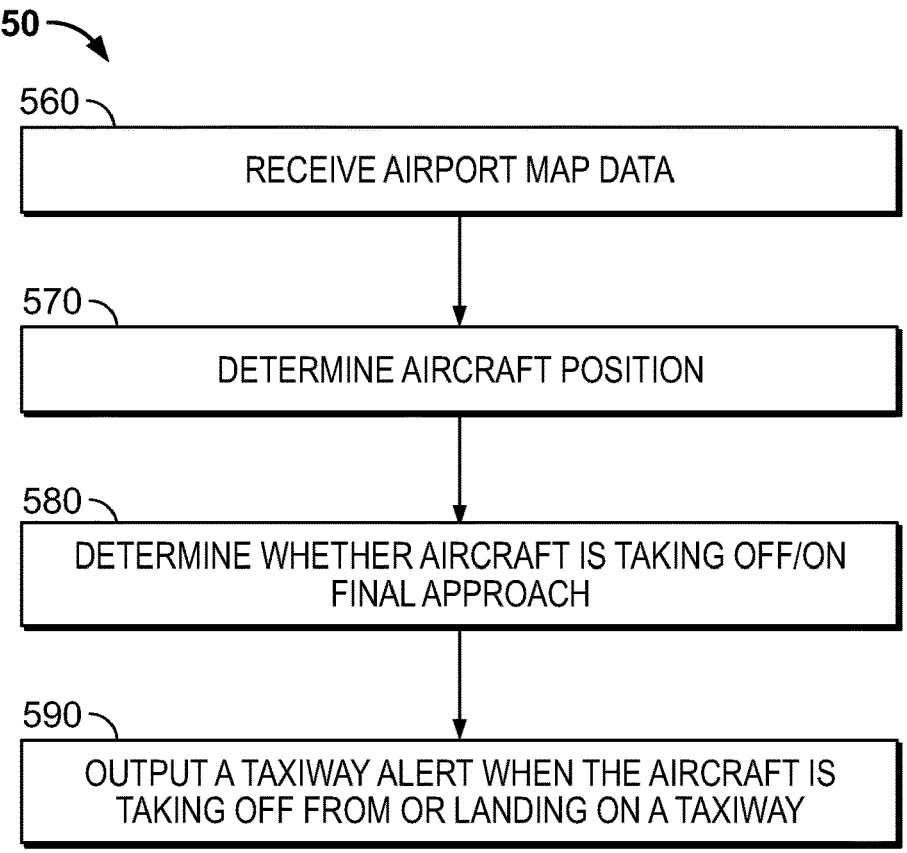
FIG. 5 is a flowchart of a method of providing a taxiway takeoff or landing alert, in accordance with an embodiment.

A flow chart of an exemplary method 550 of generating a taxiway takeoff or landing alert is disclosed in FIG. 5. In prior systems, a taxiway takeoff advisory would be issued when the following conditions were met (1) ground speed of the aircraft exceeds 40 knots, and (2) the aircraft is not aligned with a runway. The taxiway takeoff functions would be based on a database of runway locations, namely the EGPWS database 530. Prior systems do not have knowledge of the location of taxiways. A taxiway landing caution may be generated in prior systems when: (1) the aircraft is airborne between 150 and 250 feet Above Ground Level (AGL), (2) the aircraft climb rate is less than 450 Feet Per Minute (FPM), (3) the aircraft is within 5 Nautical Miles (NM) of a runway and (4) is not lined-up with a runway. Prior RAAS systems are based on a database of runway locations. The system does not have knowledge of the location of taxiways.

There are situations where such prior advisories could be considered a nuisance alert. According to the present disclosure, runway data is retrieved from the AMDB 526. In method step 110, the departure runway is obtained from flight plan data from the FMS 514. In method step 560, airport map data is retrieved from the AMDB 526, which defines spatial features of taxiways as well as runways. The runways are described in the AMDB 526 in terms of location and size. In step 570, aircraft location is determined using data from the navigation system 512. In step 580, a determination is made whether the aircraft is taking off or on final approach. In the case of an on-ground aircraft, the determination of step 580 is performed using an engine parameter or throttle position rather than speed alone. The engine and throttle position may more accurately determine take off than aircraft speed alone in some situations. The engine and throttle position may be compared with predetermined values to determine whether take off is in progress. In the case of an airborne aircraft, the determination of step 580 includes ascertaining whether the aircraft is below a predetermined elevation threshold (e.g. 250 Feet) and optionally within a 3D volumetric airspace defined with respect to the taxiway. In step 590, a taxiway take-off alert is output when: (1) the aircraft is determined to be taking off; and (2) the aircraft is positioned on a taxiway based on data from the AMDB 526. In step 590, a taxiway landing alert is output when the aircraft is: (1) determined to be landing; (2) is aligned with a taxiway, (3) is within a predetermined distance from the taxiway. Taxiway and aircraft alignment can be determined from heading or orientation data for the taxiway from the AMDB 526 and heading or track information for the aircraft from the aircraft sensors 532. In embodiments, the take-off taxiway or landing alert may be output via the aural output system 524 including an annunciation message such as "Caution Taxiway". Further, a visual advisory may be included as a message and color coding on a terrain display and/or an AMM display.

Figure 15:
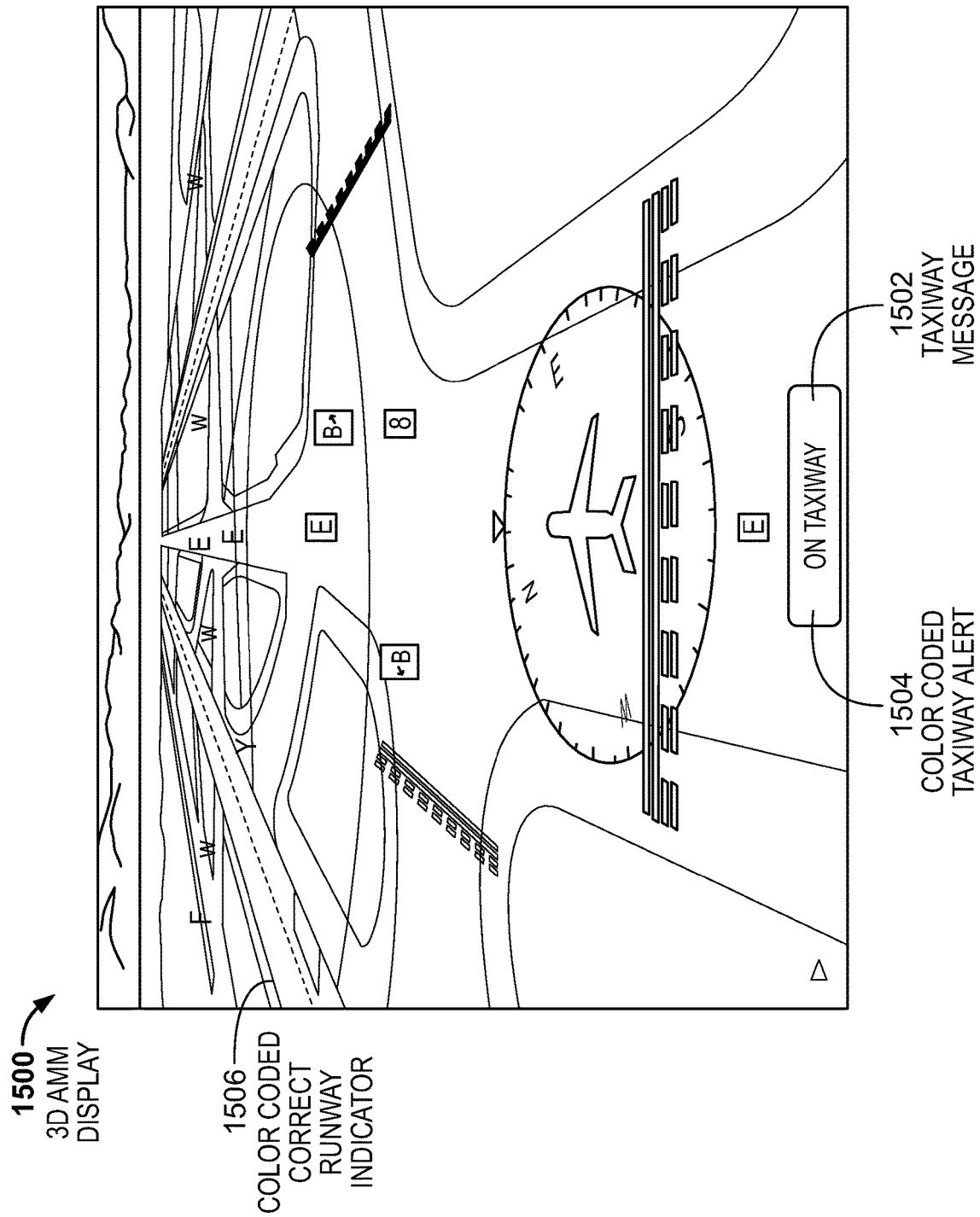
FIGS. 15 and 16 depict visual taxiway take-off alerts on an airport moving map, in accordance with exemplary embodiments.
Figure 16:
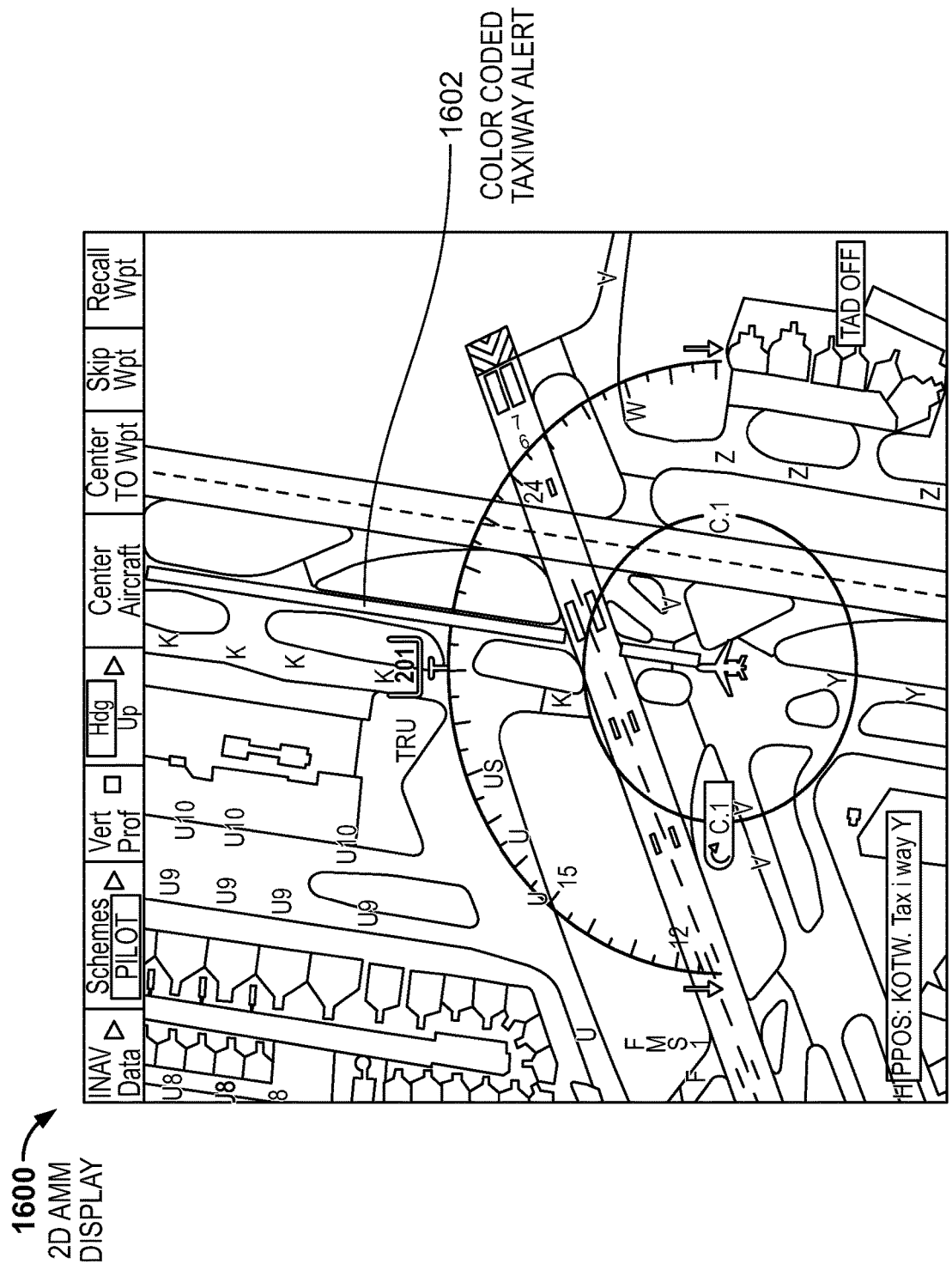

Referring to FIGS. 15 and 16, exemplary visual taxiway take-off alerts are illustrated as displayed on an AMM display. It should be appreciated that the same or similar alerts can be provided for taxiway landing alerts. In FIG. 15, a 3D AMM display 1500 is shown. The 3D AMM display 1500 provides an out of the window view of the airport. When the taxiway takeoff conditions described above are met, the 3D AMM display 1500 (and/or a 2D map display) is augmented with a visual alert cautioning the flight crew about the fact that the aircraft is located on a taxiway in addition to the aural advisory of the taxiway status. The visual alerts can include text or a graphical symbol conveying an on taxiway alert, as shown by the "taxiway" message 1504. Additionally, or alternatively, the 3D AMM display 1500 (and/or a 2D map display) includes one or more color coded taxiway alerts 1504 when the conditions described with respect to FIG. 5 are met. In the exemplary embodiment of FIG. 15, a box around the taxiway message 1502 is color coded. In further embodiments, a taxiway outline, taxiway markings, and/or a taxiway label (e.g. an alphanumeric identifier) includes graphical coloring (e.g. amber) that changes when the aircraft is determined to be taking off from a taxiway. In some embodiments, a color coded correct runway indicator 1506 is included that shows the planned departure (or arrival) runway based on FMS data when the planned departure (or arrival) runway and the taxiway are viewable in the same map display. Referring to FIG. 16, an exemplary 2D AMM display 1600 is shown, which includes a similar color coded taxiway alert 1602 that operates in the same way as the color coded taxiway alert 1504 of FIG. 15. The 2D AMM display 1600 provides a top down plan view. The color coded taxiway alert 1602 of FIG. 16 is provided in the form of coloring of the entire taxiway. The correct runway may also be colored in a distinguishing color. A taxiway outline or other taxiway feature could be colored coded additionally or alternatively. Thus, when the aircraft is taking off from the correct runway, a runway feature (such as a runway identifier and possibly other features) will be colored in a different way than when the aircraft is determined to be taking off from a taxiway (e.g. white versus amber or the like). More than one runway/taxiway features may be so color coded.

A flow chart of an exemplary method 600 of generating take-off flaps alert is depicted in FIG. 6. The take-off flaps alert is configured to provide the flight crew with awareness of improper flap setting when the aircraft is lined-up on a runway in advance of takeoff. In prior systems, the take-off flaps alert would be issued when the following conditions were met: (1) flap handle not within the valid takeoff flap setting, (2) the aircraft enters a runway, and (3) aircraft heading is within 20 degrees of the runway heading. However, there are situations where such an advisory can be considered to be a nuisance advisory such as during taxiing around an airport when the aircraft is not on the planned departure runway. According to the present disclosure, the planned FMS runway is included as part of the alert conditions to inhibit take-off flaps alerts when the aircraft is not on the planned departure runway. In method step 610, the departure runway is obtained from flight plan data from the FMS 514. In method step 620, the aircraft position and heading is determined using the navigation system 512. In step 630, the actual take-off flaps position is determined based on data from the aircraft sensors 532. A source of flap position can come from a flap handle or actual flap position sensor and may be scaled in degrees. In step 635, the required flaps position is determined by the FMS 514 based on prevailing conditions. In step 640, the take-off flaps alerts is output when the aircraft is determined to be aligned with the planned departure runway and the flaps position is not set for take-off by comparing the required and actual flaps settings. That is, the following conditions are required to output the take-off flaps alert: (1) the flaps are not within a valid takeoff flap setting, (2) the aircraft is on the planned departure runway, and (3) the aircraft heading is within 20 degrees (or some other predetermined angular range indicative of alignment) of the runway heading of the planned departure runway. In step 650, the take-off runway alert is inhibited when the aircraft is determined not to be on the planned departure runway according to the FMS 514, which would be the case during back-taxiing on a runway that is not the departure runway. In case of inadvertent take-off on an unplanned runway with improper flaps, the traditional Take-Off Configuration Warning Horn would sound (upon power application) and a wrong runway alert may be provided according to the earlier description. In embodiments, the valid takeoff flap setting may not be a predetermined criteria as with prior systems. The FMS 514 includes desired take-off flap settings during take-off that are flight plan specific relative to prevailing conditions. The present disclosure proposes to determine that the flap position is according to the FMS 514 set flap position rather than being within a certain predefined range. The output annunciation may be an aural communication such as "flaps, flaps". A visual annunciation may also be provided in a terrain display, in an AMM display or Crew Alerting System.

Figure 7:
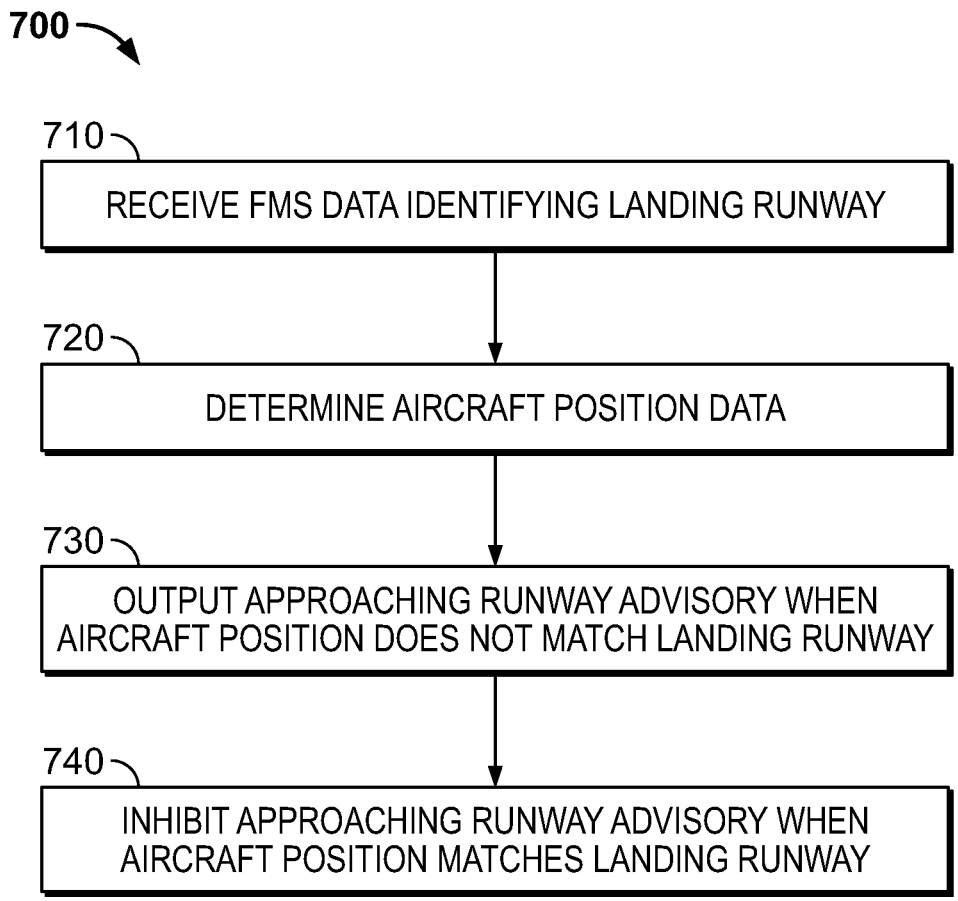
FIG. 7 is a flowchart of a method of providing an airborne approaching runway advisory, in accordance with an embodiment.

A flow chart of an exemplary method 700 of generating an airborne approaching runway advisory is disclosed in FIG. 7 to provide the crew with awareness of which runway the aircraft is lined-up with on approach. The annunciation criteria in prior systems for such an advisory includes when: (1) the aircraft is between 750 feet and 300 feet above the airport elevation (AFE), the aircraft is within 3 nautical miles (<3 NM) of the approach end of the runway, (3) the aircraft track is aligned with the runway (aircraft track is within 20 degrees of the runway heading), and (4) the aircraft position is within a variable distance laterally of the runway centerline. The required lateral distance is dynamically computed based on the current along track distance to the runway end and equals the runway width plus 100 Ft per NM of distance, limited to the runway width plus 200 Ft. Conditions (1), (2) and (4) serve to ensure that the aircraft is within a three-dimensional volume of airspace sufficiently close the approaching runway. According to the present disclosure, the planned FMS runway is included as part of the advisory conditions to inhibit approaching runway advisories when aligned with the planned arrival runway. In method step 710, the landing runway is obtained from flight plan data from the FMS 514. In method step 720, the aircraft position and track is determined using the navigation system 512. In step 730, the in-air approaching runway advisory is output when the aircraft is determined to be within a volumetric airspace close to a runway that is not the FMS planned landing runway. The volumetric air spaced may be defined as described above. In step 740 the in-air approaching runway advisory is inhibited when the aircraft is determined to be within such a volumetric airspace defined with respect to the planned landing runway, i.e. within a certain elevation range, within a certain lateral alignment of the planned landing runway, within a certain angular heading range of the planned landing runway, and within a certain distance range away from an approach end of the landing runway. In embodiments, the in-air approaching runway advisory includes the type of advisory (approaching runway) and optionally a runway identifier (e.g. 11). The approaching runway may be an aural advisory provided by the aural output system 524 and/or a visual advisory output by the display system 508. For example, the visual advisory may be included as a message on a terrain display and/or an AMM display. A wrong runway message may be output when the approaching runway visual alert is output and this may be carried out in a similar manner to that described with respect to FIGS. 8 and 9 in the foregoing (e.g. using color-coding of a runway feature in an AMM display so as to distinguish between wrong and correct approaching runway status as compared to that planned by the FMS 514).

For the sake of brevity, conventional techniques related to sensors, statistics, data analysis, avionics systems, redundancy, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A runway awareness and advisory system (RAAS) for an aircraft, comprising:
    an output device;
    a processor in operable communication with the output device, the processor configured to execute program instructions, wherein the program instructions are configured to cause the processor to:
        receive flight plan data including a planned departure runway from a Flight Management System (FMS);
        receive position data for the aircraft from a sensor system of the aircraft;
        identify a current runway based at least on the position data;
        compare the current runway with the planned departure runway to provide a comparison result;
        determine whether the aircraft is taking off based on data from the sensor system;
        identify an approaching intersecting runway that crosses the current runway;
        output, by the output device, an approaching intersecting runway advisory message of the approaching intersecting runway when the comparison result indicates the current runway and the planned departure runway do not match, and the aircraft is determined not to be taking off; and
        inhibit the approaching intersecting runway advisory message of the approaching intersecting runway when the aircraft is determined to be taking off, and the comparison result indicates the current runway and the planned departure runway match.

2. The RAAS of claim 1, wherein determining whether the aircraft is taking off based on data from the sensor system includes determining whether the aircraft is taking off based on engine data and/or throttle position data from the sensor system.

3. The RAAS of claim 1, wherein identifying the current runway based at least on the position data includes identifying the current runway based on a comparison of runway location with aircraft position and runway heading and aircraft heading, wherein the runway heading and the runway location is obtained from an airport mapping database and the aircraft position and the aircraft heading is derived from the sensor system.

4. The RAAS of claim 1, wherein whether the aircraft is determined to be approaching the intersecting runway is determined based on a comparison of the position data representing a position of the aircraft and a hold line position and intersecting runway location obtained from an airport mapping database.

5. The RAAS of claim 1, wherein the approaching intersecting runway advisory message is output audibly through an aural output system and/or visually through a display system.

6. The RAAS of claim 1, wherein the approaching intersecting runway advisory message is output visually on an airport moving map of the display system.

7. A runway awareness and advisory system (RAAS) for an aircraft, comprising:
   an output device;
   a processor in operable communication with the output device, the processor configured to execute program instructions, wherein the program instructions are configured to cause the processor to:
      receive flight plan data including a planned departure runway from a Flight Management System (FMS);
      receive position data for the aircraft from a sensor system of the aircraft;
      identify a current runway based at least on the position data;
      receive required runway length data from the FMS;
      receive available runway length data;
      identify an approaching intersecting runway that crosses the current runway;
      compare the current runway with the planned departure runway to provide a comparison result;
      determine whether the aircraft is taking off based on data from the sensor system;
      output a short runway message when, at least in part, the comparison result indicates the current runway and the planned departure runway match, the aircraft is determined to be taking off and a difference between the required runway length and the available runway length is indicative of a short runway;
      inhibit the short runway message when, at least in part, the aircraft is determined not to be taking of;
      output an approaching intersecting runway advisory message of the approaching intersecting runway when the comparison result indicates the current runway and the planned departure runway do not match, and the aircraft is determined not to be taking off; and
      inhibit the approaching intersecting runway advisory message of the approaching intersecting runway when the aircraft is determined to be taking off, and the comparison result indicates the current runway and the planned departure runway match.

8. The RAAS of claim 7, wherein outputting the short runway message includes providing the runway message as part of an airport moving map (AMM) display.

9. The RAAS of claim 7, wherein outputting the short runway message includes graphically coding the runway message as part of a feature of an airport moving map (AMM) display.

10. The RAAS of claim 9, wherein the feature is a runway outline or a runway label.

11. The RAAS of claim 9, wherein the coding includes color and/or texture coding.

12. The RAAS of claim 7, wherein the required runway length is calculated by the FMS based at least on aircraft weight.

13. The RAAS of claim 7, wherein inhibiting the short runway message is based at least in part on the aircraft being determined not to be taking off and the aircraft is not on the planned departure runway.

14. The RAAS of claim 7, wherein a required runway landing length is calculated by the FMS based at least on aircraft weight and an airborne short runway message is output when, at least in part, a comparison of the required runway length and an available runway length for a destination runway indicates a short destination runway.

15. A runway awareness and advisory system (RAAS) for an aircraft, comprising:
   an output device;
   a processor in operable communication with the output device, the processor configured to execute program instructions, wherein the program instructions are configured to cause the processor to:
      receive airport map data from an airport mapping database including an identification of taxiways and runways;
      receive flight plan data including a planned departure runway from a Flight Management System (FMS);
      receive position data for the aircraft from a sensor system of the aircraft;
      determine whether the aircraft is on ground and located on a taxiway or in air and aligned with a taxiway based on the position data and the airport map data;
      determine whether the aircraft is taking off or on final approach based on data from the sensor system;
      output, by the output device, a taxiway take-off or approaching taxiway message when the aircraft is determined to be taking off or on final approach and when the aircraft is determined to be located on the taxiway or aligned with the taxiway
      upon a determination that the aircraft is on the ground:
         determine whether the aircraft is taking off;
         identify a current runway based on the position data;
         identify an approaching intersecting runway that crosses the current runway,
         output, by the output device, an approaching intersecting runway advisory message of the approaching intersecting runway when the comparison result indicates the current runway and the planned departure runway do not match, and the aircraft is determined not to be taking off, and
         inhibit the approaching intersecting runway advisory message of the approaching intersecting runway when the aircraft is determined to be taking off, and the comparison result indicates the current runway and the planned departure runway match.

16. The RAAS of claim 15, wherein the airport map data includes three-dimensional position of the taxiways.

17. The RAAS of claim 15, wherein the approaching taxiway message is output when the aircraft is aligned with the taxiway, is within a predetermined distance of the taxiway and is below a predetermined elevation.

18. The RAAS of claim 15, wherein an airport moving map display is generated based on the airport map data including depiction of the taxiways and the runways and wherein the taxiway take-off or approaching taxiway message includes a color and/or texture coded feature associated with the taxiway.

19. The RAAS of claim 18, wherein the color coded feature is a runway outline or a runway identifier.

20. The RAAS of claim 18, wherein the program instructions are configured to cause the processor to determine the correct runway for take-off or landing based on data from the Flight Management System (FMS) and to distinguishably color code the correct runway.

\* \* \* \* \*

UNITED STATES PATENT AND TRADEMARK OFFICE
CERTIFICATE OF CORRECTION

PATENT NO. : 11,941,995 B2
APPLICATION NO. : 17/464375
DATED : March 26, 2024
INVENTOR(S) : Ratan Khatwa Page 1 of 1

It is certified that error appears in the above-identified patent and that said Letters Patent is hereby corrected as shown below:

In the Claims

Column 21, Line 45 (Claim 7), "of" should be --off--

Column 22, Line 42 (Claim 15), "," should be --;--

Column 22, Line 48 (Claim 15), "," should be --;--

Signed and Sealed this
Twenty-first Day of January, 2025

Coke Morgan Stewart
*Acting Director of the United States Patent and Trademark Office*